United States Patent
Sharifi

(10) Patent No.: US 10,198,442 B2
(45) Date of Patent: Feb. 5, 2019

(54) MEDIA CONSUMPTION HISTORY

(71) Applicant: Google LLC, Mountain View, CA (US)

(72) Inventor: Matthew Sharifi, Santa Clara, CA (US)

(73) Assignee: Google LLC, Mountain View, CA (US)

(*) Notice: Subject to any disclaimer, the term of this patent is extended or adjusted under 35 U.S.C. 154(b) by 36 days.

(21) Appl. No.: 14/142,171

(22) Filed: Dec. 27, 2013

(65) Prior Publication Data
US 2015/0052168 A1  Feb. 19, 2015

Related U.S. Application Data

(60) Provisional application No. 61/866,234, filed on Aug. 15, 2013.

(51) Int. Cl.
| | |
|---|---|
| G06F 17/30 | (2006.01) |
| G10L 25/54 | (2013.01) |
| G06Q 30/06 | (2012.01) |
| G06Q 30/02 | (2012.01) |

(52) U.S. Cl.
CPC .. *G06F 17/30041* (2013.01); *G06F 17/30026* (2013.01); *G06F 17/30029* (2013.01); *G06F 17/30035* (2013.01); *G06F 17/30044* (2013.01); *G06F 17/3053* (2013.01); *G06F 17/30401* (2013.01); *G06F 17/30424* (2013.01); *G06F 17/30477* (2013.01); *G06F 17/30746* (2013.01); *G06F 17/30787* (2013.01); *G06F 17/30867* (2013.01); *G06F 17/30876* (2013.01); *G06Q 30/02* (2013.01); *G06Q 30/0631* (2013.01); *G10L 25/54* (2013.01)

(58) Field of Classification Search
None
See application file for complete search history.

(56) References Cited

U.S. PATENT DOCUMENTS

| | | | |
|---|---|---|---|
| 6,791,580 B1 | 9/2004 | Abbott | |
| 7,181,444 B2 * | 2/2007 | Porter | G06F 17/3002 |
| 7,746,895 B2 * | 6/2010 | Bucher | G06F 17/3002 |
| | | | 370/468 |

(Continued)

OTHER PUBLICATIONS

International Search Report and Written Opinion in International Application No. PCT/US2014/051123, dated Nov. 28, 2014, 11 pages.

(Continued)

*Primary Examiner* — James Trujillo
*Assistant Examiner* — Kurt A Mueller
(74) *Attorney, Agent, or Firm* — Fish & Richardson P.C.

(57) ABSTRACT

Methods, systems, and apparatus for receiving, from a user, a request that includes an entity identifier associated with an entity that is referenced by one or more query terms of a search query, determining that the entity is identified in a media consumption database as a media item that has been indicated as consumed by the user or that the entity is associated with a media item that is identified in the media consumption database as a media item that has been indicated as consumed by the user, and based on the determination, providing a response to the request, the response including data indicating that the entity is a media item that has been indicated as consumed by the user or that the entity is associated with a media item that has been indicated as consumed by the user.

15 Claims, 4 Drawing Sheets

(56) References Cited

U.S. PATENT DOCUMENTS

| | | | |
|---|---|---|---|
| 7,937,403 B2* | 5/2011 | Kehl | G06Q 30/02 707/750 |
| 8,180,765 B2 | 5/2012 | Nicolov | |
| 8,484,017 B1 | 7/2013 | Sharifi et al. | |
| 8,954,448 B1* | 2/2015 | Durham | G06F 17/30029 707/723 |
| 9,110,954 B2 | 8/2015 | Shen et al. | |
| 2003/0212659 A1* | 11/2003 | Ban | G06F 17/30265 |
| 2005/0071323 A1* | 3/2005 | Gabriel | G06F 17/30817 |
| 2005/0222105 A1 | 10/2005 | Grasset et al. | |
| 2007/0192319 A1* | 8/2007 | Finley | G06F 17/30867 |
| 2007/0239675 A1* | 10/2007 | Ragno | G06F 17/30864 |
| 2008/0222105 A1 | 9/2008 | Matheny | |
| 2008/0222295 A1* | 9/2008 | Robinson | G06F 17/30867 709/227 |
| 2008/0275846 A1 | 11/2008 | Almas | |
| 2009/0164641 A1 | 6/2009 | Rogers et al. | |
| 2010/0070488 A1 | 3/2010 | Sylvain | |
| 2010/0211575 A1* | 8/2010 | Collins | G06F 17/30044 707/749 |
| 2011/0153050 A1 | 6/2011 | Bauer et al. | |
| 2011/0276396 A1* | 11/2011 | Rathod | G06F 17/30867 705/14.49 |
| 2012/0059495 A1 | 3/2012 | Weiss et al. | |
| 2012/0166432 A1* | 6/2012 | Tseng | G06F 17/30867 707/728 |
| 2013/0117259 A1* | 5/2013 | Ackerman | G06F 17/30867 707/722 |
| 2013/0173604 A1 | 7/2013 | Li et al. | |
| 2013/0325869 A1* | 12/2013 | Reiley | G06F 17/30035 707/741 |
| 2013/0326406 A1* | 12/2013 | Reiley | G06F 3/048 715/810 |
| 2014/0101142 A1* | 4/2014 | Gomez Uribe | G06F 17/30029 707/723 |
| 2014/0101192 A1* | 4/2014 | Sabah | G06F 17/30029 707/769 |
| 2014/0280291 A1* | 9/2014 | Collins | G06F 17/3097 707/767 |
| 2015/0052168 A1* | 2/2015 | Sharifi | G06Q 30/0631 707/769 |
| 2015/0134334 A1 | 5/2015 | Sachidanandam et al. | |

OTHER PUBLICATIONS

Lee. "Analysis of User Needs and Information Features in Natural Language Queries Seeking Music Information," Journal of the American Society for Information Science and Techonology, 61(5), 2010, pp. 1025-1045.

Song et al. "Voice search of structures media data," ICASSP 2009, IEEE, 2009 pp. 3941-3944.

Feng et al., "Speech and Multimodal Interaction in Mobile Search," IEEE Signal Processing Magazine, IEEE 1-21 NJ, US, Service Center, Piscataway, vol. 28, No. 4, Jul. 1, 2011 pp. 40-49.

International Preliminary Report on Patentability in International Application No. PCT/US2014/051126, dated Feb. 25, 2016, 8 pages.

International Preliminary Report on Patentability in International Application No. PCT/US2014/051123, dated Feb. 25, 2016, 8 pages.

Fink et al., "Social and interactive television applications based on real-time ambient-audio identification", Proceedings of the EuroITV 2006 Conference, pp. 138-146, 2006, ResearchGate.

* cited by examiner

MEDIA CONSUMPTION HISTORY

CROSS-REFERENCE TO RELATED APPLICATION

This application claims the benefit of U.S. Provisional Application Ser. No. 61/866,234, filed on Aug. 15, 2013, which is incorporated by reference.

TECHNICAL FIELD

This specification relates to processing search queries.

BACKGROUND

In general, a user can request information by inputting a query to a search engine. The search engine can process the query and can provide information for output to the user in response to the query.

SUMMARY

A system can identify content consumed by a user, as well as entities, e.g., actors, musicians, writers, directors, television networks, or other production companies, associated with the consumed content. In response to receiving a query that identifies a content item or entity, the system can provide information identifying specific content consumed by the user or entities associated with the content consumed by the user that are related to the item or entity identified by the query. For example, a user can provide a query that identifies "Justin Timberlake" to a search engine, and the search engine can provide a response to the query that includes information about "Justin Timberlake," as well as information relating to media that the user has consumed that features "Justin Timberlake." For example, the response may include information about "Justin Timberlake" such as his age, height, occupation, etc., as well as information about content that the user has consumed that features "Justin Timberlake," such as a movie that the user has seen that features "Justin Timberlake" or a concert that the user has attended that featured "Justin Timberlake."

The server-based computing environment receives indications of content consumed by the user from various sources and stores information identifying the content and entities related to the content. For example, the system can determine that the user viewed the movie "The Social Network" featuring "Justin Timberlake" on a particular date and at a particular location based on receiving information indicating that the user rented the movie "The Social Network" on the particular date and at the particular location. The system can subsequently receive a request that identifies the user and "Justin Timberlake," and can provide a response to the request that includes information about "Justin Timberlake" and can also indicate that the user saw the movie "The Social Network" that features "Justin Timberlake" on the particular date and at the particular location.

Innovative aspects of the subject matter described in this specification may be embodied in methods that include the actions of receiving, from a user, a request that comprises an entity identifier associated with an entity that is referenced by one or more query terms of a search query, determining that the entity is identified in a media consumption database as a media item that has been indicated as consumed by the user or that the entity is associated with a media item that is identified in the media consumption database as a media item that has been indicated as consumed by the user, and based on the determination, providing a response to the request, the response comprising data indicating that the entity is a media item that has been indicated as consumed by the user or that the entity is associated with a media item that has been indicated as consumed by the user.

Other embodiments of these aspects include corresponding systems, apparatus, and computer programs, configured to perform the actions of the methods, encoded on computer storage devices.

These and other embodiments may each optionally include one or more of the following features. In various examples, determining that the entity is identified in the media consumption database as a media item that has been indicated as consumed by the user or that the entity is associated with a media item that is identified in the media consumption database as a media item that has been indicated as consumed by the user comprises identifying the media item that has been indicated as consumed by the user, and wherein providing the response to the request comprises providing a response to the request that comprises data identifying the media item that has been indicated as consumed by the user; receiving, from the user, the request that comprises the entity identifier associated with the entity that is referenced by one or more query terms of the search query comprises receiving one or more query terms of the search query, determining, based on the one or more query terms of the search query, an entity associated with the one or more query terms, and identifying the entity identifier associated with the entity; the media consumption database is associated with the user, the method comprising receiving, from the user, data that includes a user identifier associated with the user, and identifying, as the media consumption database and based on the data that includes the user identifier, the media consumption database that is associated with the user; the media consumption database identifies a time when the media item was consumed by the user, and providing the response to the request comprises providing a response to the request that identifies the time when the media item was consumed by the user; the media consumption database identifies a location associated with the consumption of the media item by the user, and providing the response to the request comprises providing a response to the request that identifies the location associated with the consumption of the media item by the user; the media consumption database identifies one or more entities associated with the media item, and providing the response to the request comprises providing a response to the request that identifies the one or more entities associated with the media item.

the response to the request includes at least data indicating that the entity that is associated with the one or more query terms of the search query is identified, in the media consumption database that identifies one or more media items that have been indicated as consumed by the user, as a media item that has been indicated as consumed by the user or that the entity that is associated with the one or more query terms of the search query is associated with a media item that has been indicated as consumed by the user in the media consumption database; the response to the request includes at least data indicating either that the entity that is associated with the one or more query terms of the search query is identified, in the media consumption database that identifies one or more media items that have been indicated as consumed by the user, as a media item that has been indicated as consumed by the user, or indicating that the entity that is associated with the one or more query terms of the search query is associated with a media item that has been indicated as consumed by the user in the media consumption database; determining that the entity that is associated with the one or more query terms of the search query is identified, in the media consumption database that identifies one or more media items that have been indicated as consumed by the user, as a media item that has been indicated as consumed by the user, or that the entity that is associated with the one or more query terms of the search query is associated with a media item that has been indicated as consumed by the user in the media consumption database further comprises identifying the media item that has been indicated as consumed by the user in the media consumption database, and wherein providing the response to the request further comprises providing a response to the request that includes at least data that identifies the media item that has been indicated as consumed by the user in the media consumption database; receiving a request that includes a user identifier of a user that submitted a search query and an entity identifier of an entity that is associated with one or more query terms of the search query further comprises receiving one or more query terms of the search query, determining, based on the one or more query terms, an entity associated with the one or more query terms, and identifying the entity identifier associated with the entity; the media consumption database that identifies one or more media items that have been indicated as consumed by the user identifies a time when the media item was consumed by the user, and wherein providing a response to the request comprises providing a response to the request that includes data indicating the time when the media item was consumed by the user; the media consumption database that identifies one or more media items that have been indicated as consumed by the user identifies a location where the media item was consumed by the user, and wherein providing a response to the request comprises providing a response to the request that includes data indicating the location when the media item was consumed by the user.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
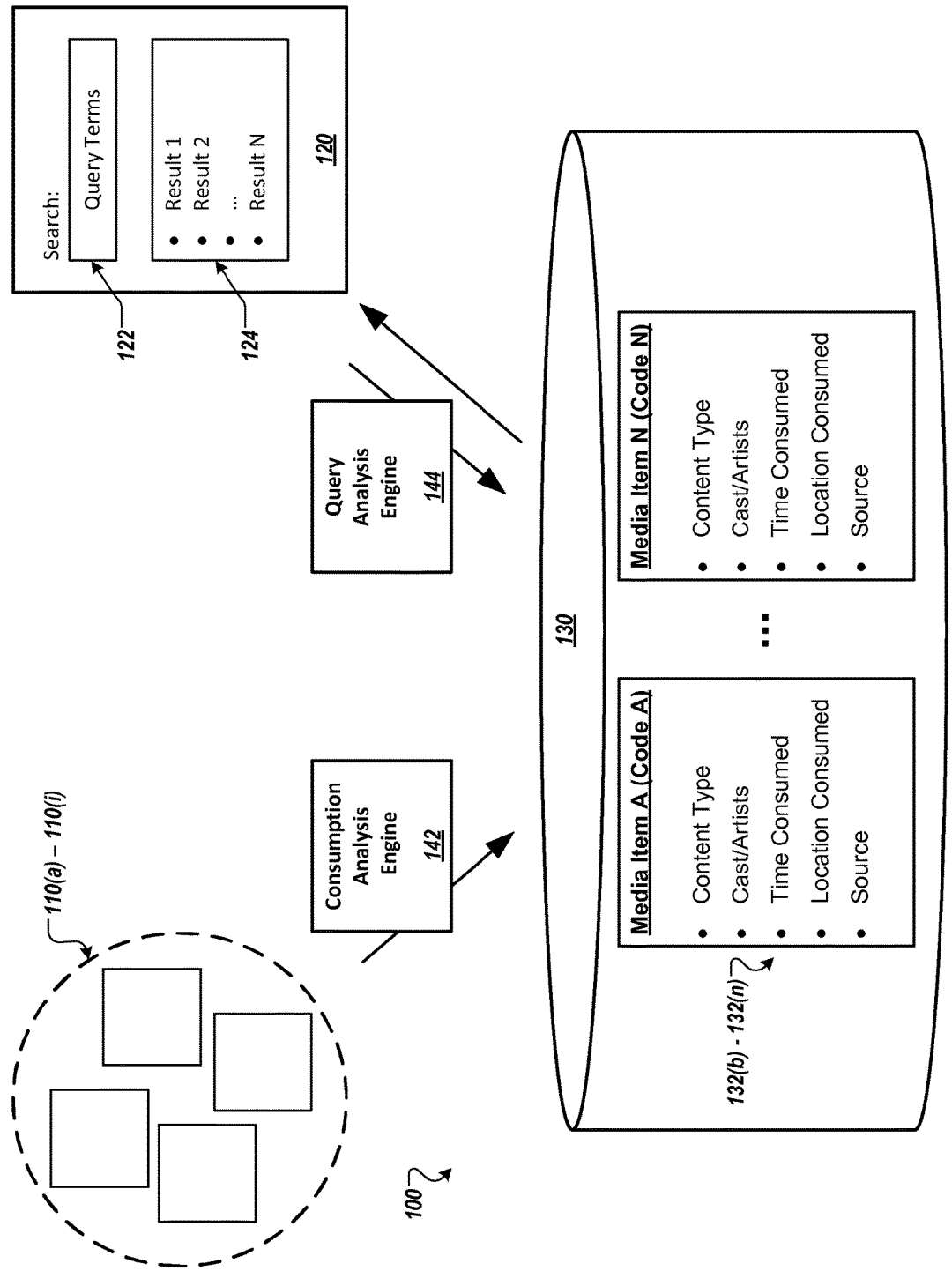
FIG. 1 depicts an example system for responding to requests based on a media consumption history.

FIG. 1 depicts a system 100 for responding to queries based on a media consumption history for a user. As used in this specification, a query can be any request for information provided to the system 100, such as a query input at a search engine or a personal assistant application.

Briefly, the system 100 can receive indications that identify content that a user has consumed and information associated with the user's consumption of the content. The system 100 can store information identifying the content, one or more entities associated with the content, and information associated with the user's consumption of the content.

A request for information can be received that identifies the user and a particular content item or entity associated with a content item, such as a search query in which one or more terms of the query identify a content item or entity. In response to the request, the user's consumption history can be accessed and one or more content items or entities can be identified that relate to the content item or entity specified by the request. The response to the request can then include information relating to or identifying the content consumed by the user and/or entities associated with the consumed content that are related to the content or entity specified by the request.

As used in this specification, content can be identified as consumed by the user based on the user likely having viewed the content, listened to the content, read the content, or otherwise been exposed to the content or a portion of the content. Therefore, categorizing content items as content consumed by the user generally includes accessing data associated with the user that identifies content that the user is reasonably likely to have consumed and categorizing the identified content as content that has been consumed by the user. Content can include content items such as one or more movies, television shows, songs, albums, concerts, plays, recorded interviews, videos, books, magazines, newspapers, websites, or other web-based, audio, video, text, or mixed media content. Additionally, one or more entities may be associated with a content item, for example, one or more actors, directors, writers, singers, musicians, artists, photographers, editors, bands, record labels, production companies, television networks, radio networks or stations, companies, products, songs, soundtracks, etc. In some instances, a content item may be referred to as an entity, e.g., a movie, television show, song, etc., or an entity associated with a content item may be a content item in its own right, e.g., a soundtrack may constitute a content item. The system 100 can include one or more content consumption sources 110 (*a*)-110(*i*), a query engine 120, a content consumption engine 130, a consumption analysis engine 142, and a query analysis engine 144.

In further detail, the one or more content consumption sources 110(*a*)-110(*i*) are in communication with the content consumption engine 130 over one or more networks, such as one or more local area networks (LAN), or wide area networks (WAN), such as the Internet. The content consumption engine 130 can receive data from the one or more content consumption sources 110(*a*)-110(*i*) indicating content consumed by a user as well as information associated with the user's consumption of the content, such as a time and place where the user consumed the content.

Data can be stored at a media consumption history database associated with the content consumption engine 130, where the data identifies the content consumed by the user and information associated with both the user's consumption of the content, e.g., when and where the user consumed the content, and the content itself, e.g., one or more entities associated with the content. For example, the consumption analysis engine 142 can identify a cast list associated with a movie that the user is identified as having viewed, and the content consumption engine 130 can store information identifying the movie, the user, a time and place where the user watched the movie, and information identifying the cast members of the movie.

The query engine 120 can be in communication with the content consumption engine 130 over one or more networks such that the content consumption engine 130 can receive and respond to requests for information from the query engine 120. Requests received from the query engine 120 can identify a user and can be analyzed by the query analysis engine 144 to identify a particular content item or entity associated with the request. Content corresponding to the particular content item or entity identified by the query analysis engine 144 can then be identified at the content consumption engine 130. For example, based on determining that a query mentions the figure "Justin Timberlake," content items consumed that feature "Justin Timberlake" can be identified, e.g., content in which "Justin Timberlake" has acted, sang, directed, produced, etc.

A response to the request provided to the query engine 120 can identify content featuring "Justin Timberlake" that the user has consumed, and can also identify additional information associated with the user's consumption of the content, e.g., when and where the user consumed the content. The response to the request can also include information pertaining to the content or entity identified from the query, as well as the information pertaining to the content that has been consumed by the user. For example, the response to the query can include a biography relating to the figure "Justin Timberlake," and a synopsis for a movie that the user has watched that features "Justin Timberlake." Information pertaining to content that has been consumed by the user or entities associated with the consumed content can be accessed at a system that is external to the system 100, for example, by accessing content that is available on the Internet over one or more networks.

Content that a user consumes can be identified by one or more sources 110(*a*)-110(*i*). According to some implementations of the described subject matter, the content consumption sources 110(*a*)-110(*i*) can include any source that is capable of receiving information that indicates particular content that has been consumed by a user, or can include sources that are capable of determining content that has been consumed by the user. In some implementations, the content consumption sources 110(*a*)-110(*i*) can use application program interfaces (API) to identify content that has been consumed by a user. In some examples, the content consumption sources 110(*a*)-110(*i*) can be any application, server, or other system capable of receiving or accessing information identifying content consumed by a user. In some implementations, the application, server, or system can identify content consumed by the user based on accessing other information associated with the user, such as financial information associated with the user or a social network profile associated with the user. In still other implementations, the content consumption sources 110(*a*)-110(*i*) can include sources of information, e.g., email, social networks, etc., that can be accessed to determine the content consumed by a user.

For example, content consumption sources 110(*a*)-110(*i*) can include sources that provide proofs of purchase of a content item. A proof of purchase may include a receipt, such as an electronic receipt received at an email address of a user, or a transaction documented by the user, e.g., using a personal finance application. A charge applied to a credit card, debit card, gift card, or other payment account associated with the user may also be used to determine that a user has consumed certain content. For example, a charge billed to a credit card can indicate that the user has likely purchased or rented a particular movie, or a purchase using a payment account, e.g., PayPal, can indicate that the user has likely purchased or rented the movie. Such payment information may indicate sufficient likelihood of the user having consumed the particular content, and the particular content associated with the payment can be categorized as having been consumed by the user. Similarly, a purchase history associated with the user can be used to determine that the user has consumed particular content. For example, purchases and/or rentals from an online store or cable network service, e.g., Google Play, Apple iTunes, Pay Per View, Comcast OnDemand, etc., can indicate that a user has consumed the particular content. In some instances, proofs of purchase associated with particular events, e.g., concert tickets purchased by a user, can indicate content that has been consumed by the user.

The content consumption sources 110(*a*)-110(*i*) may also include sources that identify a content consumption history of the user. For example, a web history associated with the user, e.g., a browser history associated with a computing device of the user, can indicate content consumed by the user. Such web content can include video or audio content consumed by the user, e.g., that the user has viewed at a website such as YouTube, Hulu, or another source, can include magazines, newspapers, or other content containing text, e.g., magazine and newspaper articles that a user has accessed using the browser, radio or other audio content consumed by the user, e.g., that the user has listened to via an Internet radio source such as Pandora Internet Radio, or can include any other content that a user can consume at a device that can access the Internet. In some instances, a user's consumption history can include content that a user has accessed using other applications or media sources, such as a cable television viewing history that indicates content the user has played or viewed through their cable television service, or content that has been downloaded and/or streamed by the user using a third party service, e.g., a Netflix or Spotify history for the user.

In some implementations, the content consumption sources 110(*a*)-110(*i*) can include sources associated with actions performed by a user or requests input by a user, e.g., at one or more client devices associated with a user. For example, a user can request that a particular song, movie, or other content be identified using a content recognition application, and based on a particular content item being identified by the application, the content item may be identified as content that has been consumed by the user. In some implementations, a request input by a user and relating to a particular content item can be interpreted as correlating to the user having consumed the content. For example, a query input at a search engine that requests times that a particular movie will be shown at a movie theatre can cause the system 100 to determine that the user watched the particular movie on the day that the user input the query and at a location corresponding to the movie theatre.

The content consumption sources 110(*a*)-110(*i*) can include sources that identify a user's interactions with one or more social networks, where such interactions may indicate or be used in determining content that has been consumed by a user. For example, a user may post a message to a social network, e.g., at a profile or message board associated with the social network, that identifies content that that the user has consumed or is consuming. In some instances, determining particular content and one or more users who are consuming the content can involve parsing text associated with a message, post, caption, or other textual content available on the social network. For example, a user may post a message to a social network that recites, "Going to see 'The Social Network' with Bob at The Senator Theater at 9:00 tonight!" Based on parsing the text of the post, the system 100 may identify content, e.g., the movie called "The Social Network," one or more users, e.g., the user who posted the message and the user identified as "Bob," a location associated with the users consuming the content, e.g., a location corresponding to "The Senator Theater," and a time and date when the content is consumed, e.g., 9:00 PM on the particular day of the post.

In addition to parsing text associated with interactions performed at a social network, such as messages, posts, and captions, other social network interactions may be used to identify content that has been consumed by a user. In some implementations, content can be identified as consumed by the user based on the user providing an endorsement for the content at a social network, e.g., by providing a "+1" for the content, as used by Google+, or a "Like" for the content, as used by Facebook and other social networks. In some instances, images, videos, or other content posted by a user and identifying a particular content item can be treated as an indication of the user consuming the particular content, e.g., on the particular day and at the particular location from where the image, video, or other content was posted. In some instances, interactions posted to the social network such as comments, posts, messages, captions, images, videos, or other interactions that mention and/or tag multiple users may indicate that the particular content associated with the interaction was consumed by both the user posting the interaction as well as the one or more other users mentioned or tagged in association with the interaction. In some instances, "check-ins" or other indications of a user's location can be used to determine content consumed by a user, the "check-in" or other indication also identifying a time and a location associated with the user consuming the content.

Identifying a location associated with a user's consumption of a content item can include identifying a geographic location associated with the consumption of the content and/or a name of a location associated with the consumption of the content. For example, consumption of content by a user can be associated with a particular geographical location, such as a set of coordinates, e.g., latitude and longitude or other global positioning system (GPS) coordinates, can be associated with a particular distance from a present location or from a home location, can be associated with a particular city, state, zip code, area code, county, region, or country, or can be otherwise by identified by a geographical location. In some implementations, a location can be identified by the name of a business or a type of business, e.g., "The Senator Theater" or "movie theatre," can be identified by an event that is taking place at a particular location at a particular time, e.g., at a location corresponding to the "Maryland State Fair," can be identified by a street address, by a name assigned to a particular location by a user, e.g., a location identified as a user's place of employment or home, or can be identified in another way.

Identifying a time associated with a user's consumption of a content item can include identifying a particular date, day, or time, e.g., hour of the day, when the user consumed the identified content. In some implementations, a time associated with a user's consumption of particular content is based on a time that the content consumption sources $110(a)$-$110(i)$, the consumption analysis engine 142, or the content consumption engine 130 receive data indicating that the particular content has been consumed by the user. In other implementations, a time associated with a user consuming particular content may be determined based on information received, e.g., at the content consumption sources $110(a)$-$110(i)$, that indicates a time that the content was consumed by the user. For example, information indicating that a user rented the movie "The Social Network" at 8:00 PM on Thursday, Jul. 4, 2013 can be received at a content consumption source $110(a)$-$110(i)$, content analysis engine 142, or content consumption engine 130 at 12:00 PM on Friday, Jul. 5, 2013. Based on the information received, the time that it was received by the system 100, and the implementation utilized, the time associated with the user watching the movie "The Social Network" may be identified as 8:00 PM on Thursday, Jul. 4, 2013, 12:00 PM on Friday, Jul. 5, 2013, or some subset of these dates, days, and times, e.g., Jul. 4, 2013 or Friday, Jul. 5, 2013.

Additional information may be received by the one or more content consumption sources $110(a)$-$110(i)$ related to the consumption of content by users. For example, additional information may include information pertaining to the content item, such as a file type of the content item, e.g., MP4, WAV, JPEG, HTML, etc., a file size or playback length associated with the content item, e.g., 100 Megabytes or 10 minutes in length, a quality or compression resolution associated with the file type, e.g., 1080p or 256 kbps, or other information pertaining to the content item as it was consumed by the user, e.g., whether the content item was black and white content, color content, content that was shown in high definition or standard definition, etc. In some implementations, a device used to access the content can be identified. For example, a particular content item may be a music album, and the content consumption sources $110(a)$-$110(i)$ can determine that the user has listened to the music album using a particular mobile phone, smartphone, laptop or desktop computer, tablet computer, MP3 player, or other computing device.

Information received by the one or more content consumption sources $110(a)$-$110(i)$ may further indicate the exact source or event that resulted in particular content being identified as consumed by a user. For instance, information received at a source $110(a)$-$110(i)$ can indicate particular content consumed by a user and a location and/or time that the content was consumed by the user, and can further indicate an event or a source of the indication that resulted in the content be identified as consumed by the user. As an example, data received can identify a particular movie that a user has viewed, a time and location where the user viewed the movie, and can further indicate that the movie was identified as having been watched by the user based on an email received at an email address associated with the user indicating that the user has purchased a movie ticket to attend the movie.

In some implementations, identifying content that has been consumed by a user can further include identifying or estimating particular portions of the content that have been consumed by the user. In some implementations, identifying content using audio recognition can involve identifying timestamps of the content that correspond to portions of the content that were identified and/or the portions of the content to which the user was exposed. For example, in response to a user requesting audio recognition of content, a content consumption source $110(a)$-$110(i)$ associated with the request may receive data identifying a content item and further identifying a segment of the content item that was analyzed to identify the content, e.g., a 30 second segment of the content upon which audio recognition was performed to identify the content.

In some implementations, information identified by one or more content consumption sources $110(a)$-$110(i)$ can be supplemented by other information accessed by the system 100 to determine content consumed by a user. For instance, information received may identify content consumed by a user as well as a location and/or time when the user consumed the content, and the consumption analysis engine 142 can access additional information associated with the content, the location, or the time.

In some implementations, the consumption analysis engine 142 may be an application hosted on one or more computers, may be associated with a server, or may be another system capable of accessing information relevant to identified content and/or a location or time when a user consumed the identified content. In some examples, the consumption analysis engine 142 may be a separate component from both the content consumption sources 110(*a*)-110(*i*) and the content consumption engine 130, or can be integrated with the content consumption sources 110(*a*)-110(*i*) and/or content consumption engine 130. The consumption analysis engine 142 may be capable of exchanging electronic communications over one or more networks, for example, to exchange electronic communications with the content consumption sources 110(*a*)-110(*i*) and the content consumption engine 130, or to access information that is available external to the system 100, e.g., to access information that is available on the Internet. In some implementations, the consumption analysis engine 142 receives information identifying content that a user has consumed and/or a location or time associated with the user's consumption of the content. The consumption analysis engine 142 can analyze the information and/or access additional information associated with the content, the location, and/or the time.

In some instances, the consumption analysis engine 142 can receive an indication identifying content that has been consumed by a user, and one or more content items associated with the identified content can be identified and classified as having been consumed by the user. For example, based on determining that a user has watched a certain movie, a determination can also be made that the user consumed content corresponding to the soundtrack of the movie. In some implementations, the one or more related content items can be identified based on the information obtained by the one or more sources 110(*a*)-110(*i*), e.g., that identifies the soundtrack of the movie, or can be based on information obtained from another resource that is accessible by the consumption analysis engine 142, e.g., at a database that identifies the soundtracks of movies.

Identifying related content that has been consumed by a user can, in some implementations, be determined based on the source used to determine that the content was consumed by the user. As an example, if an audio recognition request is provided by a user and the audio recognition engine identifies the content as being a part of "The Phantom of the Opera" soundtrack, the consumption analysis engine 142 may determine that the user likely consumed both "The Phantom of the Opera" soundtrack as well as the Broadway production of "The Phantom of the Opera," e.g., that the user provided the audio recognition request while attending a performance of "The Phantom of the Opera." However, if a determination is made that the user has consumed "The Phantom of the Opera" soundtrack based on purchase history data, e.g., data received at a content consumption source 110(*a*)-110(*i*) indicating that the user purchased "The Phantom of the Opera" soundtrack at an online music store, then the consumption analysis engine 142 may determine that the user has not likely consumed both the soundtrack and the live performance of "The Phantom of the Opera."

The location and/or time associated with a user's consumption of content may also be considered when determining other content related to the content that the user is likely to have consumed. For instance, based on receiving information indicating that the user has performed an audio recognition to identify "The Phantom of the Opera" soundtrack while at a location corresponding to a theatre, the consumption analysis engine 142 may determine that the user has likely consumed both "The Phantom of the Opera" soundtrack as well as the live performance of "The Phantom of the Opera." However, based on receiving information indicating that the user has performed an audio recognition to identify "The Phantom of the Opera" soundtrack while at a location corresponding to the user's place of employment, a determination may be made that the user has likely only consumed "The Phantom of the Opera" soundtrack, and is not likely to have viewed the live performance of "The Phantom of the Opera."

In some instances, the consumption analysis engine 142 can receive information identifying a time and location where a user was located, and can identify content that the user likely consumed while at the particular location during the identified time. In some instances, the content can be identified by accessing information, e.g., over one or more networks, that indicates content that is likely to be available at the location during the specified time. For example, based on a social network "check-in" indicating that a user was located at "Radio City Music Hall" on a particular date, the consumption analysis engine 142 may access information to determine content that the user likely consumed while located at "Radio City Music Hall" on the particular date.

Additional information relating to content consumed by a user can be identified. In some implementations, the additional information can be identified by the consumption analysis engine 142. The additional information can be identified by accessing information that is available over one or more networks, such as by accessing information available on the Internet or at a database or server that is accessible over the one or more networks. In some instances, the additional information relating to the consumed content can be maintained and accessed at the system 100, for example, at the content consumption engine 130.

In some implementations, supplemental information accessed by the consumption analysis engine 142 that relates to particular content can include information relating to the particular content. For example, additional information relating to an identified content item can include a content type for the content item, e.g., a general content type for the content item that indicates whether the content is a video, audio, image, or text, or a specific content type for the content item that indicates whether the content is a television show, podcast, audio book, movie, concert, newspaper, magazine, etc. Information relating to an identified content item can also include information associated with the production of the content, such as a year that the content was produced, a location where it was produced, a producer of the content, etc.

Supplemental information accessed by the consumption analysis engine 142 can further identify one or more entities that are associated with the content. For example, information relating to an identified content item can include information identifying one or more people associated with the content item, e.g., a cast list for the content item, a director or producer of the content item, individuals' voices that appear in the content item, writers or editors associated with the content item, etc. In some implementations, identifying one or more people associated with a content item includes identifying the role of the one or more people with respect to the content item, e.g., a character played by an actor in a movie.

In some implementations, identifying one or more entities that are associated with the content can further include identifying one or more content items that are relevant to the content consumed by the user. For example, based on receiving information indicating that a user has viewed a particular movie, one or more other movies or other content items can be identified that are relevant to the particular movie, e.g., one or more movies or television programs that feature actors from the identified movie. According to another example, one or more content items that are relevant to the movie viewed by the user may be movies or other content items that are relevant to the identified movie in other ways, e.g., based on the other movies being nominated for an award that was the same as the identified movie, based on the movies being directed or produced by a common person, etc.

Based on identifying particular content consumed by a user, one or more other users that are relevant to the identified content may also be determined. For instance, based on receiving an indication that a user consumed particular content while at a certain location and/or at a certain time, one or more other users that are relevant to the consumption of the content by the user may be identified. In some examples, users that are relevant to the consumption of the content by the user may be one or more users that are indicated as being with the user at the time the content was consumed. For example, a post at a social network profile of the user may identify a content item, e.g., a movie, as well as one or more other users, e.g., other people that the user was with while viewing the movie.

Determining one or more other users associated with a particular content item may also be determined based on the locations of one or more other users at the time the user consumed the particular content. For instance, based on identifying content that the user consumed while located at "Radio City Music Hall," one or more other users can be identified as related to the particular content based on determining that the other users were also at "Radio City Music Hall" at a similar time. In other examples, one or more other users that are relevant to the identified content may be other users that have also consumed the identified content. For example, based on receiving an indication that a user has viewed the movie "The Social Network," one or more other users can be identified that have also been identified as having viewed the movie "The Social Network," e.g., based on information accessed at social network profiles of the one or more other users, based on accessing information at the system 100 indicating other users that have been identified as having viewed the movie, etc.

In some instances, additional analysis may be performed relating to content consumed by a user, a location that the user consumed the content, and/or a time when the content was consumed by the user. In some instances, the consumption analysis engine 142 can perform such analysis based on receiving information from one or more content consumption sources 110(*a*)-110(*i*) indicating content that has been consumed by a user at a particular time and/or location. In some instances, the analysis can also consider additional information received at the consumption analysis engine 142, e.g., one or more timestamps associated with the user recognizing or viewing the content, a device used by the user to consume the content, a source of the indication that the user has consumed the content, etc.

In some instances, timestamps or other information relating to a user's consumption of content can be identified and used to determine or estimate a portion of the content item consumed by the user. Additional information regarding the content item can be identified based on the portion of the content that is identified as having been consumed by the user. For instance, a movie that the user has watched may be identified based on cable television history data, e.g., data that identifies digital cable television content that the user has watched, and the cable television history data may be used to determine that the user watched a specific portion of the movie and not the entire movie. In another example, timestamps detected based on an audio recognition process can be used to determine a portion of a movie that a user has likely watched, e.g., at least a one hour portion of the movie that includes the segments of the movie corresponding to the identified timestamps. Based on determining the specific portion of the movie watched by the user, information can be accessed that is relevant to the specific portion of the movie, e.g., a partial cast list that is relevant only to the portion of the movie watched by the user, a portion of a soundtrack that is played during the portion of the movie, or other entities associated with the portion of the movie.

In some implementations, identifying a portion or extent to which a user has consumed particular content can allow the content to be categorized as content that has been fully consumed, partially consumed, or unconsumed by the user. For instance, based on cable television history data indicating that a user has viewed all of a first movie but only a portion of a second movie, a determination can be made that the user has fully viewed the first movie but has only partially viewed the second movie. In some instances, a portion of a content item that has been consumed may be determined, e.g., a number of minutes of the movie or a fraction of the movie's total playing time, and a content item can be identified as fully consumed, partially consumed, or unconsumed based on the amount of time or fraction satisfying one or more thresholds. For example, if less than 25 percent of a content item is identified as having been consumed by the user, the content item may be categorized as unconsumed by the user, if 25 percent to 75 percent of the content item is identified as consumed by the user, the content item may be categorized as partially consumed, and if more than 75 percent of the content item has been consumed by the user, then the content item may be identified as fully consumed.

In some implementations, a confidence score can be determined and associated with particular content that indicates a likelihood that the identified content has been correctly identified. For example, the consumption analysis engine 142 can determine content consumed by a user and can consider one or more factors associated with the consumption of the content to determine a confidence score to assign to the content and/or one or more entities associated with the content. For instance, a content item that has been identified based on cable television history data may be assigned a confidence score that indicates a higher likelihood of the content being correctly identified that a content item that has been identified using audio recognition. In some implementations, a higher likelihood may be indicated by a higher confidence score, e.g., a greater magnitude, may be indicated by a lower confidence score, e.g., a lower magnitude, or may be indicated using another scoring method. In practice, any number of factors may be used to determine a confidence score or other confidence scores to assign to particular content that has been consumed by a user, such as the source by which the content was recognized, the location or time associated with the content being consumed, etc.

For example, a separate confidence score can be determined that indicates a likelihood that identified content was fully consumed by a user. A content item can be categorized as having been fully consumed based on the determination that the user has likely viewed, listened to, read, or otherwise been exposed to a sufficient portion of the content item, e.g., 75 percent, and the confidence score can indicate an estimated likelihood that the user has actually fully consumed the content item. For instance, content that has been identified as consumed based on a receipt, e.g., a movie theatre receipt indicating that the user viewed a particular movie in theatres, may be assigned a confidence score that indicates a higher likelihood of the content item being fully consumed by the user than content that has been identified as consumed by the user based on an audio recognition process. In practice, any number of factors may be used to determine such a confidence score to assign to the particular content. For example, the portion of a movie's audio that is used to identify the movie may be indicative of whether the user has fully watched the movie, e.g., such that a movie recognized using audio from an opening scene of the movie receives a higher confidence score than a movie recognized based on audio from a closing scene of the movie. In other examples, a location or time associated with the user consuming the content can be indicative of whether the user fully consumed the content, e.g., such that if the user viewed a movie from 1:00 AM to 4:00 AM at their home, it is likely that the user has fallen asleep during the movie and not fully watched the movie.

In some implementations, one or more factors and/or confidence scores may be aggregated to determine an overall score associated with particular content that has been consumed by a user. For example, factors including a confidence by which the content was identified, a confidence that the content was fully consumed by a user, a source used to determine that the content was consumed by the user, a location, time, or device associated with the user consuming the content, etc., can be used to determine an overall score associated with the particular content. In some instances, such a score can also be identified for one or more entities associated with content, e.g., a particular actor that appears in a movie. Based on factors such as the amount of time that the actor appears in the movie, when the actor first appears in the movie, a popularity or success of the movie, etc., a score can be assigned to the entity corresponding to the actor.

In some implementations, feedback provided by a user may be used to identify or confirm content consumed by the user. For instance, based on determining that a user may have consumed particular content, a notification can be provided to a user, e.g., output at a client device associated with the user, that requests the user to confirm whether they have consumed the particular content and/or to confirm a location and time associated with the user consuming the content. For example, an audio recognition result may indicate that a user has recently viewed the movie "The Social Network," and a notification can be provided to the user that requests confirmation from the user that he or she has recently viewed the movie "The Social Network." Based on the user indicating that he or she has recently viewed the movie "The Social Network," the movie "The Social Network" can be identified as content that the user has consumed, and a location and time associated with the user consuming the content can be identified. In some instances, feedback provided by a user regarding particular content can result in changes to confidence scores associated with the content or one or more entities associated with the content, e.g., by increasing a confidence score associated with particular content based on the user confirming that they have consumed the particular content.

According to some implementations of the described subject matter, content and/or entities associated with content may be identified using a content or entity code. For example, the consumption analysis engine 142 or another component of the system 100 can identify a code, such as an alphanumeric code, quick response (QR) code, barcode, or other code that uniquely identifies a particular content item or entity. In some implementations, codes may be organized such that certain codes, code prefixes, or code types are associated with certain content types. For example, all movie content codes may begin with a certain letter or number, while all song content codes may begin with a different letter or number. A code that uniquely identifies a particular content item or entity can be associated with the content item or entity, e.g., by associating the code with the data identifying the content item or entity and the other relevant information, e.g., the location and time when the content was consumed.

Codes may be generated and assigned to content and/or entities associated with content by the system 100, e.g., by the content consumption sources 110(a)-110(i), the consumption analysis engine 142, or the content consumption engine 130. For example, based on receiving information indicating that a user has consumed content for which a code does not yet exist, e.g., a movie that has not yet been identified as viewed by the user and therefore has not been assigned a code, a code can be generated, e.g., by the content consumption source 110(a)-110(i) that reported the user watching the movie, the consumption analysis engine 142, or the content consumption engine 130, that uniquely identifies the movie, and the generated code can be assigned to the particular movie. Similarly, based on determining that one or more entities associated with the movie have not been assigned a code, e.g., one or more actors in the movie have not been assigned a code identifying the actor, codes can be generated and associated with the one or more entities that uniquely identify the entities.

In other implementations, codes associated with content items and/or entities associated with content items may be accessible to the system 100, e.g., over one or more networks. For example, the consumption analysis engine 142 may receive an indication that particular content has been consumed by a user, and the consumption analysis engine 142 can identify a code to assign to the content, e.g., by accessing a database over the one or more networks that includes codes associated with particular content items and entities associated with content items. In some implementations, codes associated with content items and/or entities associated with content items may be accessed by the system 100 prior to receiving an indication that the user has consumed particular content. For example, codes associated with content items and/or entities can be accessed and stored at the content consumption engine 130, and based on identifying content that the user has consumed, the consumption analysis engine 142 or another component can identify one or more codes associated with the content and/or entities and can assign the proper codes to the content and/or entities.

Based on determining content consumed by a user, relevance scores can be determined and associated with the content item and/or one or more entities associated with the content item. A relevance score may indicate an extent to which a user is perceived to like or be interested in a particular content item and/or entity, or may indicate the relevance of a particular content item to a particular entity associated with the content item and/or the relevance of a particular entity to a particular content item.

For example, a relevance score may indicate a likely level of interest that a user has in an identified content item or entity. In some implementations, such a relevance score may be determined based on information that identifies the content item consumed by the user and one or more entities associated with the content item. For instance, content identified as having been consumed by a user based on the user providing an endorsement of the content at a social network may be assigned a higher relevance score in comparison to other content identified as having been consumed by the user based on the user's cable television history. Other information may be used in determining a relevance score associated with a content item. For example, a relevance score may be increased based on receiving data indicating that a user has consumed particular content more than one time, e.g., has re-watched a movie, that indicates a location where the user has consumed the content, e.g., at a movie theatre as opposed to their home, etc. Based on the received data, a relevance score may be generated and assigned to the content item and/or the one or more entities associated with the content item.

A relevance score assigned to an entity and associated with a particular content item may reflect an extent to which the entity is featured or relevant to the particular content item. Similarly, a relevance score assigned to a content item and related to a particular entity may reflect an extent to which to which the particular content item is relevant to the particular entity. For example, the consumption analysis engine 142 can assign a relevance score to an actor associated with a movie in which the actor has the leading role such that the relevance score reflects a rather high level of relevance, based on the actor being a principal figure in the movie. Similarly, a relevance score assigned to a movie and associated with a particular actor may be assigned a rather high level of importance based on the movie being a movie that the actor is known for, e.g., that the actor has won an award for or that was a popular role for the actor.

In some implementations, content items and/or entities associated with content items may be assigned ranks based on confidence scores and/or relevance scores assigned to the content items and/or entities. For instance, two or more consumed content items that feature a particular entity, e.g., two or more movies that feature a particular actor, can be assigned a rank, where the rank is based on one or more confidence scores and/or relevance scores assigned to the content items. In such an example, a content item that is ranked first may be a content item in which the entity has considerable relevance, e.g., a main character in a movie, while a content item with a lower rank may be a content item in which the entity has less relevance, e.g., a movie in which the actor only has a supporting role.

According to some implementations, assigning confidence scores, relevance scores, and/or ranks to one or more content items and/or entities associated with content items can be performed by the consumption analysis engine 142. For example, the consumption analysis engine 142 may access information relevant to two or more content items, e.g., on the Internet, and assign confidence scores and relevance scores to the two or more content items. For example, information accessed may indicate the role of an actor in each of two movies, and relevance scores may be assigned to the two movies based on the extent to which the movies feature the actor. The relevance scores can be maintained, e.g., at the content consumption engine 130, and the consumption analysis engine 142 may rank the two movies and/or other movies based on accessing the scores maintained at the content consumption engine 130.

Information identifying content consumed by a user, a location and time when the user consumed the content, and other identified information can be stored at a media consumption history database associated with the content consumption engine 130. For example, the consumption analysis engine 142 and/or the content consumption sources 110(a)-110(i) can transmit information related to content consumed by a user to the content consumption engine 130 over one or more networks, and the content consumption engine 130 can receive and store the information. In some instances, the information can be stored at a media consumption history database associated with the content consumption engine 130.

Storing information related to content consumed by a user at the content consumption engine 130 can include storing entries 132(b)-132(n) corresponding to the media items consumed by the user. The entries 132(b)-132(n) can identify content items that have been categorized as consumed by the user, e.g., that have been identified in information received at the one or more content consumption sources 110(a)-110(i) as having been consumed by the user. Each of the entries 132(b)-132(n) can identify a particular content item, e.g., using the name of the content item and/or a code associated with the content item, as well as additional information corresponding to the consumed content.

As shown in FIG. 1, information associated with the entries 132(b)-132(n) can include information identifying the content type, e.g., movie, television show, album, soundtrack, magazine, etc., the cast or artists associated with the content, e.g., one or more actors, singers, writers, or other entities associated with the content, a time when the content was consumed by the user, e.g., 8:00 PM on Jul. 4, 2013, a location associated with the user's consumption of the content, e.g., "Radio City Music Hall," a source of identification of the consumed content, e.g., a post at a social network, an email containing a ticket receipt, a Netflix purchase history, etc., and other information associated with the user's consumption of the content and/or the content itself. For instance, additional information may include one or more scores or ranks associated with the content, information associated with the production of the content, information identifying content that is similar or related to the content, one or more other users that are associated with the content or the user's consumption of the content, etc.

In some implementations, additional entries 132(b)-132(n) that correspond to entities associated with content may be maintained at the content consumption engine 130. For example, based on receiving information identifying content that has been consumed by a user, the content consumption engine 130 can identify one or more entities associated with the content that has been consumed by the user, and can include entries corresponding to the entities associated with the consumed content in the entries 132(b)-132(n). For example, the content consumption engine 130 can receive information identifying the movie "The Social Network" as content that has been consumed by the user, and can identify one or more entities associated with the movie, e.g., the actors "Justin Timberlake," "Jesse Eisenberg," and the director "David Fincher." Entries corresponding to the actors "Justin Timberlake" and "Jesse Eisenberg," as well as the director "David Fincher," can be included in the entries 132(b)-132(n) maintained at the media consumption history database of the content consumption engine 130, where the entries 132(b)-132(n) corresponding to "Justin Timberlake," "Jesse Eisenberg," and "David Fincher" can identify information and/or one or more entities associated with the entries 132(*b*)-132(*n*), e.g., one or more content items associated with each of "Justin Timberlake," "Jesse Eisenberg," and "David Fincher," and other information.

The data stored at the content consumption engine 130 and corresponding to one or more content items consumed by a user and/or entities associated with content items consumed by a user can be stored in any number of formats. For instance, data may be stored in a tabular format or other data matrix, or in a hierarchical data structure. In some implementations, each entry 132(*b*)-132(*n*) may correspond to a particular row or column of the data matrix, and information associated with each of the content items and/or entities associated with content may be included as entries in the row or column of the data matrix. Similarly, in other implementations, each entry 132(*b*)-132(*n*) may correspond to a particular high-level item in the hierarchical data structure, and information associated with each of the content items and/or entities associated with the content may be included as lower-level items depending from the high-level items in the hierarchical data structure.

In some implementations, a subset of the information associated with the entries 132(*b*)-132(*n*) can be stored at locations other than the content consumption database 130. For example, information identifying a particular content item that has been consumed by a user and information associated with the user's consumption of the content item, e.g., a time and location associated with the user consuming the content, can be maintained at the content consumption engine 130, and additional information associated with the content item, e.g., information identifying the cast of the content item, can be stored elsewhere, e.g., at a server external to the content consumption engine 130. In such instances, accessing information associated with a content item that has been consumed by the user can involve accessing information associated with an entry 132(*b*)-132(*n*) at the content consumption database 130 that corresponds to the content item as well as accessing information associated with the content item at an additional resource that is external to the content consumption engine 130, e.g., at another server accessible to the query engine 120 and/or query analysis engine 144. In some instances, accessing the information associated with the content, e.g., information identifying the cast of the content item, can be achieved by accessing a source of the content and/or the content item itself. For example, the additional information associated with the content item can be accessed at a location where the content item is stored or by accessing metadata associated with the content item.

Entries 132(*b*)-132(*n*) may be identified and accessed to obtain information relating to one or more content items consumed by a user and/or entities associated with content items consumed by the user. In some implementations, content and/or entities associated with content may be identified at the content consumption engine 130 using a code that uniquely identifies particular content items and/or entities. In other instances, content and/or entities associated with content can be identified based on a search performed at the content consumption engine 130, e.g., a search that specifies a name of the content or entity.

In some implementations, content, entities associated with content, and/or information relating to the content and/or entities can be identified at the media consumption history database of the content consumption engine 130 by performing expansion of the entries 132(*b*)-132(*n*). For example, an entry associated with a particular movie can be identified, and the entry can be expanded to reveal additional information associated with the entry. For instance, the expansion of a particular entry associated with a particular content item can enable the identification of a content type associated with the content item, one or more actors, artists, writers, or other entities associated with the content, a time associated with the user's consumption of the content, a location associated with the user's consumption of the content, a source of the indication that the user consumed the content, etc.

Based on the content consumption engine 130 maintaining entries 132(*b*)-132(*n*) identifying content and/or entities associated with content that has been consumed by a user, requests for information input by the user can be processed such that responses to the requests provide information that is relevant to content that has been consumed by the user. For example, a user can access a query engine 120, e.g., an interface that is associated with a search engine, and can provide one or more query terms at a query input field 122. Content and/or entities associated with content can be identified from the terms of the user-input query, and content consumed by the user or entities associated with content consumed by the user can be identified. A response to the user-input query can identify the content consumed by the user and/or entities associated with content consumed by the user that correspond to the content and/or entities identified from the terms of the user-input query. Such results may also include additional information relevant to the content consumed by the user and/or entities associated with the content consumed by the user, such as a time and location where the user consumed the identified content or content associated the entities.

The query engine 120 can include an interface capable of receiving a user input that requests information. In some implementations, query engine 120 may be an application interface that accepts textual input or voice input provided by a user. For example, the query engine 120 may be a personal assistant application associated with a computing device of a user, such as a user's cellular phone, smartphone, tablet computer, laptop computer, desktop computer, mp3 player, or other device. In other applications, the query engine 120 may be a system that is accessible on the Internet, e.g., at a web page associated with a search engine, or that is accessible using other means, e.g., by accessing a database or server system over one or more networks, such as one or more local area networks (LAN) or wide area networks (WAN).

The query engine 120 can identify a user that has provided a query or other request for information. For instance, a user can be identified based on identifying a name of the user, based on identifying a user account, e.g., an account associated with a user, a client device of a user, an email account of a user, an account associated with the query engine 120, etc., based on identifying a user from voice data associated with a voice input query, based on identifying a code assigned to the user that uniquely identifies the user, e.g., an alphanumeric code associated with the user, based on identifying a code or other identifier associated with a client device of the user, e.g., an internet protocol (IP) address associated with the user's device, or using another method. In some implementations, a query received at the query engine 120 can be a voice input query, and the query engine 120 can perform voice recognition to determine terms of the voice input query. In other implementations, the query engine 120 can transmit voice data corresponding to the voice input query to the query analysis engine 144 or to another system, and the query analysis engine 144 or other system can perform voice recognition to determine the terms of the voice input query. In some implementations, determining terms of a voice input query can involve obtaining a transcription of the voice input query and determining terms of the voice input from the text of the transcription of the voice input query.

The query engine 120 can receive inputs from a user, for example, at the query input field 122, and can display results of the query at a results field 124. In some instances, the query engine 120 obtains results by submitting a received query and information identifying the user to the query analysis engine 144 and/or content consumption engine 130 over one or more networks, and receiving results from the query analysis engine 144 and/or content consumption engine 130 over the one or more networks.

In greater detail, the query analysis engine 144 receives data identifying a user and terms associated with a user input query, and performs analysis of the terms to identify content and/or entities associated with the query. For example, the query analysis engine 144 can parse the text of the query, e.g., the one or more terms of the query, and can identify objects from the text of the query. Objects can include nouns or phrases from the text of the query, e.g., one or more proper nouns, phrases, nouns, or other parts of speech that may correlated to content, e.g., a name of a movie, or entities associated with content, e.g., a name of an actor.

Based on identifying objects from the query, the query analysis engine 144 can identify content items and/or entities associated with content items that correspond to the objects. In some instances, the query analysis engine 144 can identify content items and/or entities based on accessing a database that stores the names of content items and/or entities associated with content items, e.g., by accessing the database over one or more networks. In some instances, the database may be associated with the content consumption engine 130, or can be a database associated with another system, e.g., that is external to the system 100 and that is accessible over the one or more networks. In some instances, identifying content items and/or entities associated with content items that correspond to the objects can include identifying a code or other identifier associated with the content items and/or entities associated with the content items. For example, the query analysis engine 144 can identify the figure "Justin Timberlake" from the objects included in the query, and can further identify an alphanumeric code that uniquely identifies the figure "Justin Timberlake."

In some implementations, the query analysis engine 144 may be an application hosted on one or more computers, may be associated with a server, or may be another system capable of identifying content and/or entities based on terms included in a query. In some implementations, the query analysis engine 144 is a separate component from both the query engine 120 and the content consumption engine 130, or can be integrated with the query engine 120 and/or the content consumption engine 130. The query analysis engine 144 may be capable of exchanging electronic communications over one or more networks, for example, to exchange electronic communications with the query engine 120 and/or the content consumption engine 130, or to access information that is available on the Internet.

The query analysis engine 144 communicates with the content consumption engine 130 to identify content that the identified user has consumed or entities associated with the user-consumed content corresponding to the content and/or entities identified from the query. For example, the query analysis engine 144 can identify one or more content items and/or entities associated with content items from the terms of the query, and can transmit information identifying the one or more content items and/or entities associated with content items to the content consumption engine 130. In some implementations, the query analysis engine 144 can additionally transmit information identifying the user to the content consumption engine 130.

The content consumption engine 130 can receive data identifying the user and the content and/or entities identified from the query, and can identify content that has been consumed by the user that corresponds to the content and/or entities identified from the query. For example, the content consumption engine 130 can receive data identifying the user that input the query from the query engine 120 or the query analysis engine 144, and can receive data identifying one or more content items and/or entities associated with content items that have been identified from the query from the query analysis engine 144. The content consumption engine 130 can receive the data identifying the user and the one or more content items and/or entities over one or more networks.

In some implementations, the content consumption engine 130 can identify content that the identified user has consumed. For example, based on receiving data identifying the user that provided the query, the content consumption engine can identify entries 132(b)-132(n) at the media consumption history database associated with the content consumption engine 130 that identifies content that has been consumed by the user. In some instances, users can be identified by the user's name, by an account associated with the user, by a code associated with the user, or by a code or other identification associated with a computing device of the user, e.g., an IP address associated with the user's device. The content consumption engine 130 can receive the information identifying the user and can identify entries 132(b)-132(n) that are associated with the user based on the entries 132(b)-132(n) specifying the user identifier corresponding to the user, e.g., the particular IP address, code, account name, or other information identifying the user.

Based on identifying entries 132(b)-132(n) that are associated with the user, entries that correspond to the content and/or entities identified from the query can be determined. For instance, based on the query identifying the figure "Justin Timberlake," one or more entries associated with the user can be identified that correspond to the figure "Justin Timberlake." Entries that may correspond to the figure "Justin Timberlake" may include, for example, the entry corresponding to the movie "The Social Network," in which "Justin Timberlake" was an actor.

In some implementations, identifying entries that correspond to the content and/or entities identified from the query can involve expanding the entries 132(b)-132(n) stored at the media consumption history database of the content consumption engine 130 to identify entries that identify the particular content and/or entities identified from the query. In some implementations, identifying entries that correspond to the content and/or entities identified from the query can involve performing a search at the media consumption history database associated with the content consumption engine 130 for the particular content and/or entities. For instance, identifiers for the content and/or entities identified from the query, e.g., the names or codes used as identifiers of the content and/or entities can be submitted as a query on the media consumption history database, and one or more content items and/or entities corresponding to those identified from the query can be determined. Other techniques may be used to identify entries from among the entries 132(b)-132(n) corresponding to the user that are related to the content and/or entities identified from the query.

Based on identifying one or more content items consumed by the user and/or entities associated with content items consumed by the user that correspond to the content and/or entities identified from the query, data identifying the one or more user-consumed content items and/or entities associated with user-consumed content items can be transmitted by the content consumption engine 130. For instance, the content consumption engine 130 can transmit information identifying the one or more user-consumed content items and/or entities associated with user-consumed content items to the query analysis engine 144 over one or more networks. In some instances, transmitting data that identifies the user-consumed content items and/or entities associated with user-consumed content items can involve transmitting data that includes additional information relating to the user-consumed content items and/or the entities associated with the user-consumed content items. The additional information may include information such as a location and time when content was consumed by the user, other content items and/or entities relevant to the user-consumed content and/or entities associated with user-consumed content, one or more scores associated with the user-consumed content and/or entities associated with the user-consumed content, one or more users associated with the user-consumed content and/or entities associated with the user-consumed content, or other information that has been determined and stored in association with the entries at the media consumption history database, e.g., other information determined by the content consumption sources 110(a)-110(i), the consumption analysis engine 142, and/or the content consumption engine 130.

The query analysis engine 144 can receive the information relating to the user-consumed content and/or entities associated with user-consumed content that correspond to the query, and can perform analysis of the information relating to the user-consumed content and/or entities associated with the user-consumed content. In some implementations, the analysis performed by the query analysis engine 144 can include determining the relevance of the identified user-consumed content and/or entities associated with user-consumed content to the content and/or entities identified from the query. For example, the query analysis engine 144 can determine the relevance of the movie "The Social Network" to the figure "Justin Timberlake."

In some implementations, identifying the relevance of identified user-consumed content and/or entities associated with user-consumed content can include determining or generating a relevance score for the user-consumed content and/or entities associated with user-consumed content. For example, a relevance score can be determined for the movie "The Social Network" that the user has watched in relation to the figure "Justin Timberlake." In some implementations, as described, the relevance score can be determined based on the extent to which entities are featured or relate to particular content items, e.g., based on whether an actor has a large role in a movie or a small role in a movie, and/or based on the extent to which two content items are related, e.g., based on the extent to which two movies are associated with one another by being sequels to one another, by featuring the same actors or directors, etc. In some implementations, the query analysis engine 144 can generate a relevance score, e.g., based on the factors described, or can identify a relevance score that has already been assigned to the content consumed by the user and/or entities associated with content consumed by the user, e.g., that has been assigned by the consumption analysis engine 142. In other implementations, the query analysis engine 144 can identify relevance scores associated with user-consumed content and/or entities associated with user-consumed content that have been determined by the consumption analysis engine 142.

In some instances, the query analysis engine 144 can determine a relevance score for the user-consumed content and/or entities associated with user-consumed content based on other objects or terms of a query. For example, one or more terms or objects that do not correspond to content and/or entities associated with content can be identified from a query. Based on receiving information identifying content consumed by the user and/or entities associated with content consumed by the user, a relevance score can be determined for each of the content items consumed by the user and/or entities associated with content items consumed by the user that reflect the relevance of the content items and/or entities to the other objects or terms. For example, based on determining that the query received from the user identifies the figure "Justin Timberlake" and also identifies the object "Mark Zuckerberg," which does not correspond to a particular content item or entity associated with a content item, the query analysis engine 144 may determine that the movie viewed by the user called "The Social Network" is highly relevant, based on the movie "The Social Network" featuring a character named "Mark Zuckerberg." In some implementations, the query analysis engine 144 can identify synonyms or related terms for the objects or terms of the query, and a relevance score can reflect the relevance of a content item and/or entity to the synonyms or related terms.

In some implementations, based on the identified and/or determined relevance scores, ranks can be determined for the content items and/or entities associated with content items that indicate the relevance of the user-consumed content and/or entities associated with the user-consumed content to the query. For example, based on determining relevance scores for each of the user-consumed content items and/or entities associated with the user-consumed content items, ranks can be assigned to the user-consumed content items and the user-consumed entities such that content items and/or entities having a relevance score indicating greater relevance will have a higher rank, while content items and/or entities having a relevance score indicating less relevance will have a lower rank. In some instances, the query analysis engine 144 can receive information indicating ranks for the content items consumed by the user and/or entities associated with content items consumed by the user, and the query analysis engine can use the indicated ranks as the ranks indicating the relevance of the user-consumed content items and the entities associated with the user consumed content items to the query.

The query analysis engine 144 can transmit data identifying and indicating the relevance of the user-consumed content and/or entities associated with the user-consumed content that are associated with the content and/or entities identified from the query to the query engine 120. For example, the query analysis engine 144 can transmit the data received at the query analysis engine 144 from the content consumption engine 130 that identifies the user-consumed content and/or entities associated with the user-consumed content to the query engine 120, and can also transmit data indicating the relevance of the identified user-consumed content and/or entities associated with the user-consumed content to the query engine 120. In some implementations, the data can be transmitted by the query analysis engine 144 to the query engine 120 over one or more networks.

The query engine 120 can receive the data from the query analysis engine 144 and can provide information for output to the user that provided the query. For example, the query engine 120 can receive information identifying the content that has been consumed by the user and/or entities associated with the content that has been consumed by the user that is associated with the query input by the user, as well as data identifying the relevance of the identified content and/or entities associated with the content. The query engine 120 can determine, based on the received information, information and/or resources to provide for output at the results field 124. For example, based on receiving the query that identifies the figure "Justin Timberlake," the query engine 120 can determine to output results that indicate personal information relating to "Justin Timberlake," e.g., his age, height, occupation, etc., as well as information relevant to the user regarding the figure "Justin Timberlake," e.g., information indicating that the user has seen "Justin Timberlake" in the movie "The Social Network," which the user watched at 8:00 PM on Jul. 4, 2013 at a particular location. In some instances, the information provided for output by the query engine 120 can include information not contained in the information received from the query analysis engine 144, e.g., can include information that was accessed over the Internet or at another system external to the system 100. In some instances, the information provided for output at the results field 124 by the query engine 120 can include information received from the query engine 144, such as portions of content relevant to the query that a user has consumed, or other information. In some instances, the query engine 120 can provide information for output at the results field 124 such that information accessed external to the system 100 is delineated from the information provided for output that was received from the query analysis engine 144, e.g., such that the two sets of information are displayed in different information panels.

Figure 2:
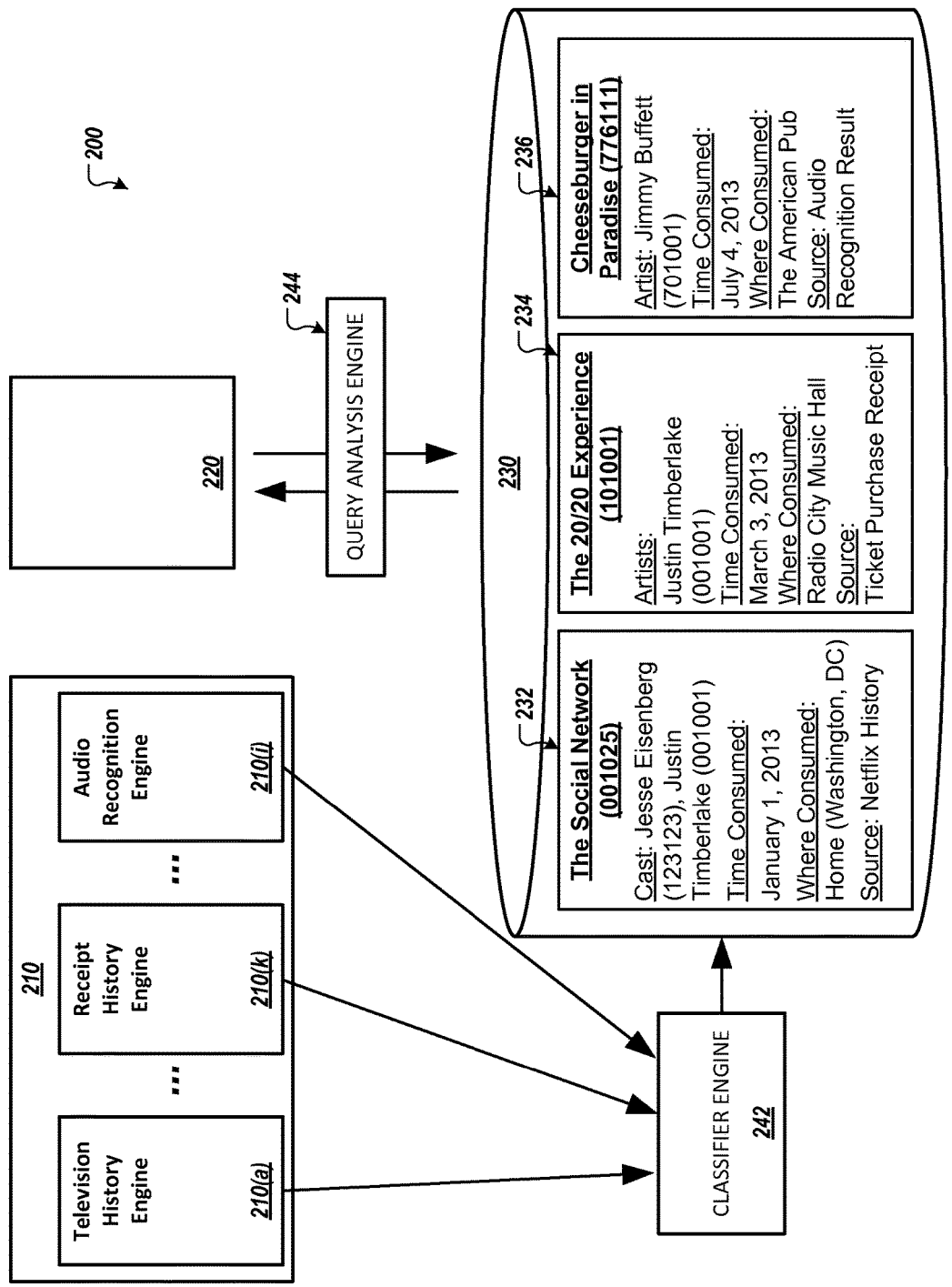
FIGS. 2 and 3 depict portions of example systems for responding to requests based on a media consumption history.

FIG. 2 depicts a portion of an example system 200 for creating a media consumption history and utilizing the media consumption history to respond to requests. For example, the system 200 can be capable of receiving data identifying content consumed by a user, determining content associated with the user's consumption of the content, and storing information identifying the content consumed by the user and information associated with the user's consumption of the content. The system 200 includes one or more content consumption sources 210(*a*)-210(*i*) that are included in a content consumption source engine 210, a classifier engine 242, a query engine 220, a query analysis engine 244, and a content consumption engine 230. In some instances, the components of the system 200 can perform operations similar to those performed by the system 100.

The content consumption sources 210(*a*)-210(*i*) can receive information that identifies content that a user has consumed. For example, the television history engine 210(*a*), receipt history engine 210(*k*), and audio recognition engine 210(*i*) can each receive information that identifies content consumed by a user. For instance, content consumed by a user can include a movie that a user has viewed on television, and the television history engine 210(*a*) can receive information identifying the movie viewed by the user, as well as additional information associated with the user viewing the movie. In another example, the receipt history engine 210(*k*) can receive information identifying content that has been identified as consumed by a user, based on the receipt history engine 210(*k*) identifying a receipt that the user has received and a content item associated with the receipt. For example, the receipt history engine 210(*k*) can identify a receipt that indicates that the user has attended a concert, and the receipt history engine 210(*k*) can identify content associated with the concert, e.g., a recent album released by the artist who performed at the concert. In another example, the audio recognition engine 210(*i*) can receive a request input by a user to identify content corresponding to audio data obtained from the environment of the user, and the audio recognition engine 210(*i*) can identify the audio as corresponding to particular content. The audio recognition engine 210(*i*) can then identify the recognized content as content that has been consumed by the user. In another implementation, the audio recognition engine 210(*i*) can receive information identifying content that has been identified by an audio recognizer, e.g., an audio recognizer that is external to the system 200, and can determine that the user has consumed the identified content.

In some implementations, as described, information may be received by the content consumption sources 210(*a*)-210(*i*) of the content consumption source engine 210 in addition to the data identifying content consumed by the user. For instance, additional information may identify locations and times when the user consumed particular content, or can identify other information associated with the user's consumption of the content. The content consumption source engine 210 or the content consumption sources 210(*a*)-210(*i*) can transmit data identifying the content consumed by the user and the additional relevant information to the classifier engine 242.

The classifier engine 242 can receive the data identifying content consumed by the user and can perform analysis on the received data. For instance, the classifier engine 242 can determine a content type for each of the identified content items, for example, by identifying a content item as a movie, album, song, etc. The classifier engine 242 can access additional information relevant to the identified content. Such information can include additional information relevant to the content items, e.g., by identifying one or more entities associated with the content items, identifying information relating to the production of the content items, identifying content items related to the identified content items, identifying other users associated with the user's consumption of the content items, etc.

Based on determining a content type for each of the content items and identifying additional information relevant to the content items, the classifier engine 242 can transmit information identifying the content consumed by the user, the content type associated with each of the content items consumed by the user, and the additional information relevant to the content items consumed by the user. In some instances, as shown in FIG. 2, the classifier engine can transmit the information to the content consumption engine 230.

The content consumption engine 230 can receive the information identifying content consumed by the user and other relevant content, and can store the information as entries in a media consumption history database associated with the content consumption engine 230. In some implementations, the content consumption engine 230 can generate entries at the media consumption history database that correspond to the content items identified as consumed by the user. In some instances, entries generated at the media consumption history database can also include entries that correspond to entities associated with the content items identified as consumed by the user. For example, the media consumption history database generates entries corresponding to the actors or a director of a movie, artists associated with a song or album, writers associated with a magazine or screen play, etc. In some implementations, as described, codes can be assigned to one or more content items consumed by the user and/or entities associated with content items consumed by the user.

For example, based on receiving data from the classifier engine 242, entries 232, 234, and 236 can be generated at the content consumption engine 230 that correspond to content items consumed by a user. For example, based on the television history engine 210(a) determining that the user has viewed the movie "The Social Network," an entry 232 is generated at the content consumption engine 230 that corresponds to the movie "The Social Network." For instance, the entry 232 is associated with the movie "The Social Network," where the movie "The Social Network has been assigned a code "001025," and where the entry 232 includes additional information relating to the movie "The Social Network" and the user's viewing of "The Social Network." As shown, such information includes information identifying one or more cast members of the movie, e.g., the actors "Jesse Eisenberg (123123)" and "Justin Timberlake (001001)," a time when the movie was viewed by the user, e.g., Jan. 1, 2013, a location where the user viewed the movie, e.g., at their home in Washington, D.C., and a source that identified the movie as having been viewed by the user, e.g., a Netflix television history. In other implementations, as described, the entry 232 can include a subset of the information associated with the content item and the consumption of the content item. For example, the entry 232 can identify information associated with the consumption of the movie "The Social Network" by the user, e.g., a time and location where the user watched the movie, and information associated with the content item "The Social Network," e.g., the cast of the movie, can be identified at another source, e.g., at a server that stores information associated with the movie "The Social Network."

Similarly, the entry 234 can be generated at the content consumption engine 230 that corresponds to the album "The 20/20 Experience." For instance, the entry 234 can be associated with the album "The 20/20 Experience," where the album has been assigned a code "101001," and where the entry 234 includes additional information relating to the album "The 20/20 Experience" and the user's consumption of the content. Such information can include, for example, information identifying an artist associated with the album "The 20/20 Experience," e.g., the artist "Justin Timberlake (001001)," a time when the user is identified as having consumed the content, e.g., Mar. 3, 2013, a location where the content was consumed by the user, e.g., "Radio City Music Hall," and a source that identified the content as having been consumed by the user, e.g. a receipt corresponding to a concert ticket purchased by the user to attend a concert by "Justin Timberlake" at "Radio City Music Hall" on Mar. 3, 2013.

As another example, the entry 236 is generated at the content consumption engine 230 that corresponds to the song, "Cheeseburger in Paradise," where the song "Cheeseburger in Paradise" has been assigned the code "776111." The entry 236 also includes information relating to the song "Cheeseburger in Paradise" and the user's exposure to the song "Cheeseburger in Paradise." For example, as shown, in FIG. 2, the song "Cheeseburger in Paradise" is associated with the artist "Jimmy Buffett (701001)," was listened to by the user on Jul. 4, 2013, was listened to at a location called "The American Pub," and was identified as having been consumed by the user based on an audio recognition request.

Requests for information can be received at a query engine 220, and responses to the requests for information can include information associated with entries stored at the media consumption history database that identify content consumed by the user. For example, a user can provide a query at a search engine associated with the query engine 220, and the query engine 220 can submit the terms of the search query to a query analysis engine 244.

The query analysis engine 244 can receive information identifying the terms of the search query, and can identify one or more content items and/or entities associated with the search query. Data identifying the one or more content items and/or entities associated with the query can be submitted to the content consumption engine 130. The content consumption engine 230 can identify content that has been consumed by the user and/or entities associated with content consumed by the user that correspond to the content items and/or entities identified from the search query. For example, content consumed by the user and/or entities associated with content consumed by the user can be identified by accessing entries stored at the media consumption history database that are associated with the user. Information relating to the identified content items consumed by the user and/or entities associated with content items consumed by the user can be transmitted to the query engine 220, e.g., based on the query analysis engine 244 determining the most relevant information to provide to the query engine 220 in response to the search query. The query engine 220 can receive the information, and can provide a response to the search query that identifies content items consumed by the user and/or entities associated with content items consumed by the user that correspond to the search query. In some implementations, the response to the search query can include additional information relating to the content consumed by the user, e.g., a location and time when the user consumed the content.

Figure 3:
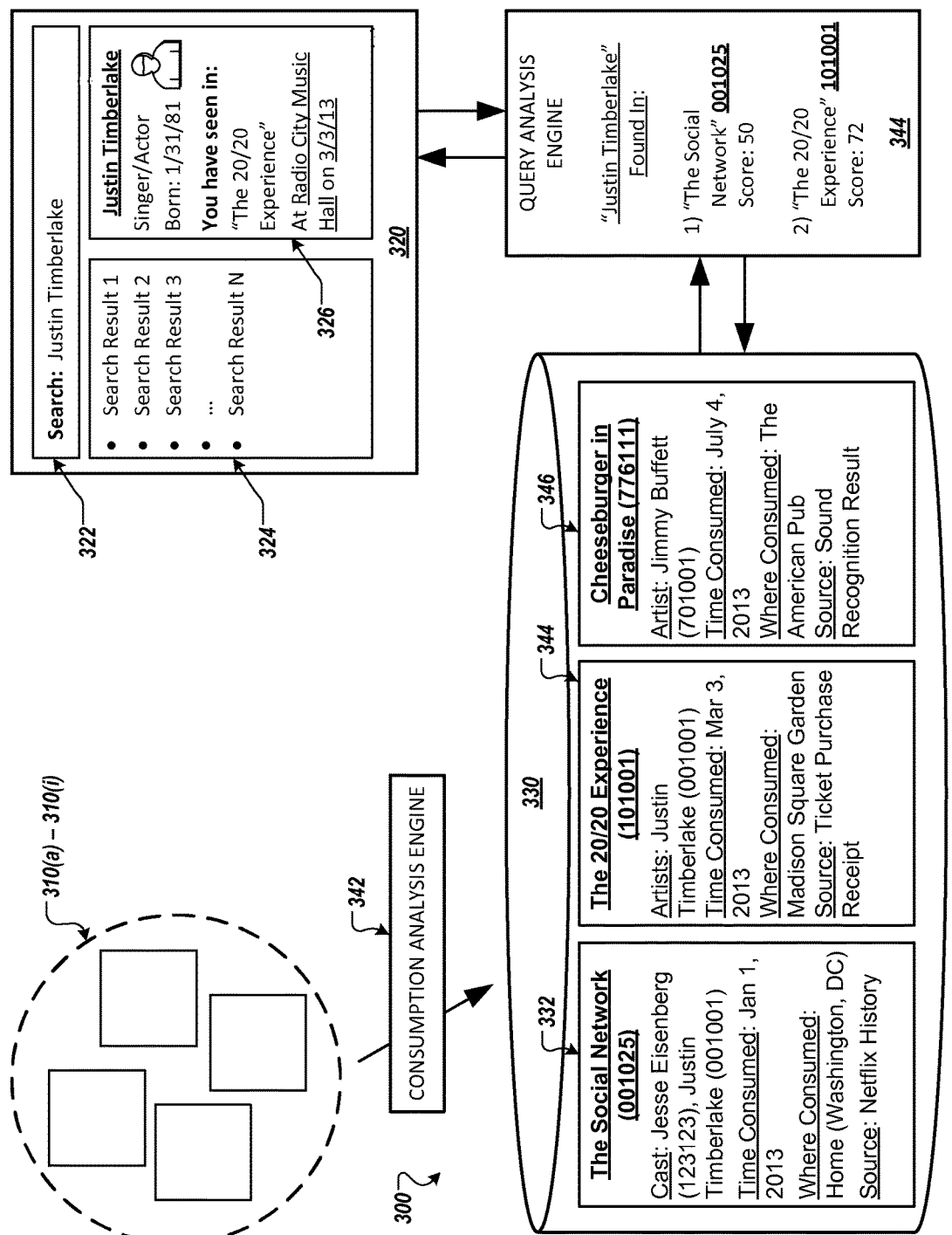

FIG. 3 depicts a portion of an example system 300 for responding to requests for information based on a media consumption history. For example, the system 300 can be capable of receiving a request for information, determining content that has been consumed by a user and/or entities associated with content that has been consumed by the user that relate to the request for information, and providing a response to the request for information that identifies the content and/or entities that correspond to the request for information. As shown, the system 300 includes a query engine 320, a query analysis engine 344, a content consumption engine 330, a classifier engine 342 and one or more content consumption sources 310(a)-310(i). In some instances, the components of the system 300 can perform operations similar to those performed by the system 100.

The content consumption engine 330 can include a media consumption history database that identifies content that has been consumed by a user and/or entities associated with content that has been consumed by the user. For example, as shown in FIG. 3 the content consumption engine 330 can include the entries 332, 334, and 336 identifying the content items "The Social Network," "The 20/20 Experience," and "Cheeseburger in Paradise," that have been consumed by the user. The entries 332, 334, and 336 can be similar to the content items 232, 234, and 236 identified with respect to FIG. 2. As shown, the entries 332, 334, and 336 identify content items consumed by a user, as well as information relating to the content items and/or the user's consumption of the content items. In some instances, the entries 332, 334, and 336 include information that has been received and/or identified by the classifier engine 342 or content consumption sources 310(a)-310(i).

A user can provide a request for information at a query engine 320. For example, a user can access a search engine, e.g., at a webpage that is accessible over the Internet, and can input a search query at a query input field 322 accessible at an interface of the search engine. In one example, the user can input the search query "Justin Timberlake" at the query input field 322 to request information relating to the figure "Justin Timberlake." Based on receiving the input requesting information relating to "Justin Timberlake," the query engine 320 can submit the terms of the query request, for example, by submitting the query request to the query analysis engine 344.

As described, the query analysis engine 344 can receive data from the query engine 320 that includes the terms of the search query, and can identify one or more content items and/or entities associated with the search query. For example, based on receiving the search terms "Justin" and "Timberlake" from the query engine 320, the query analysis engine 344 can identify the entity "Justin Timberlake." In some instances, identifying a particular content item and/or entity associated with a content item can include identifying a code that identifies the content item and/or entity. For example, based on identifying the entity "Justin Timberlake," a code associated with "Justin Timberlake" can be identified, e.g., the code "001001." Based on identifying the entity "Justin Timberlake (001001)," the query analysis engine 344 can communicate with the content consumption engine 330 to identify content items that have been consumed by the user that correspond to the entity "Justin Timberlake (001001)" and/or entities associated with content that has been consumed by the user that correspond to the entity "Justin Timberlake (001001)."

For example, the information associated with the entries 332, 334, and 336 can be accessed to determine which, if any, of the content items associated with the entries 332, 334, and 336 correspond to the entity "Justin Timberlake (001001)." In some instances, entries can be identified that match the entity "Justin Timberlake (001001)" based on matching the entity "Justin Timberlake (001001)" against the names of the entries 332, 334, 336, e.g., by determining if any of the titles of the entries 332, 334, 336 include "Justin Timberlake." In other instances, the entries 332, 334, 336 can be expanded to determine if any of the entries 332, 334, 336 include information that identifies the entity "Justin Timberlake." For example, the entity "Justin Timberlake (001001)" can be matched against the information associated with the entries 332, 334, and 336, e.g., the cast and/or artists associated with the entries 332, 334, 336, or other entities identified as being associated with the entries 332, 334, 336.

Identifying content items and/or entities associated with a search query can further include identifying content items and/or entities that are identified as relevant to a particular query or to responding to a particular query. For example, the query analysis engine 344 can receive data from the query engine 320 that includes terms of a search query, and the query analysis engine 344 can identify one or more content items and/or entities that are relevant to providing a response to the search query. For instance, a user may input the query, "Who is Jessica Biel's husband," and in response to the query, the query analysis engine 344 can identify "Justin Timberlake" as the husband of "Jessica Biel" and/or one or more entities associated with "Justin Timberlake," e.g., one or more movies that feature "Justin Timberlake" that the user has consumed.

In some implementations, the query analysis engine 344 can identify content items and/or entities that are relevant to providing a response to a search query by accessing information that identifies content items and/or entities that correspond to the terms of the search query. For example, the query analysis engine 344 can identify the terms "Jessica," "Biel," and "husband" from a search query, and can access information at the content consumption engine 330 or at another location, e.g., information that is accessible on the Internet, that corresponds to the terms of the search query. Based on accessing the information that corresponds to the terms of the search query, e.g., that indicates that the husband of "Jessica Biel" is "Justin Timberlake," the query analysis engine 344 can access information that identifies content items and/or entities that are relevant to the query and/or to responding to the query, e.g., information that identifies one or more content items that feature "Justin Timberlake" that the user has consumed.

Based on determining that one or more of the entries 332, 334, 336 correspond to the entity "Justin Timberlake (001001)," information identifying the entries that correspond to the entity "Justin Timberlake (001001)" can be received at the query analysis engine 344. For example, the entries 332 and 334, associated with the content items "The Social Network (001025)" and "The 20/20 Experience (101001)," can be identified as entries that correspond to the entity "Justin Timberlake (001001)" identified from the search query. For instance, a determination can be made that "The Social Network (001025)" features "Justin Timberlake (001001)" as an actor, and that "The 20/20 Experience (101001)" features "Justin Timberlake (001001)" as an artist. Based on determining that the entries 332 and 334 are relevant to the entity "Justin Timberlake (001001)," information associated with the entries 332 and 334 can be received at the query analysis engine 344, e.g., the content consumption engine 330 can transmit information associated with the entries 332 and 334 to the query analysis engine 344.

In other implementations, information associated with all of the entries stored at the media consumption history database of the content consumption engine 330 that are associated with the user can be transmitted to the query analysis engine 344, and the query analysis engine 344 can determine which of the entries correspond to the search query. For example, information associated with the entries 332, 334, and 336 can be transmitted to the query analysis engine 344, and the query analysis engine can identify which of the entries 332, 334, and 336 are relevant to the content items and/or entities identified from the search query.

A relevance score can be applied to each of the entries 332, 334, 336 and/or the entries 332, 334 identified as relevant to the search query that indicates an extent to which an entry is relevant to the search query. For example, relevance scores can be determined and assigned to the entry 332 associated with "The Social Network (001025)" and the entry 334 associated with "The 20/20 Experience (101001)" that indicate a relevance of each of the entries to the entity "Justin Timberlake (001001)" identified from the search query. As described, the relevance score applied to the entries 332, 334 can reflect the extent to which the entry relates to the search query, e.g., based on the role of "Justin Timberlake (001001)" in "The Social Network (001025)" and based on the role of "Justin Timberlake (001001)" in "The 20/20 Experience (101001)." For example, an analysis performed by the query analysis engine 344 can determine a relevance score of 50 to assign to the entry 332 associated with the "Social Network (001025)" and a relevance score of 72 to assign to the entry 334 associated with "The 20/20 Experience (101001)." In some implementations, relevance scores can be assigned to all of the entries 332, 334, 336 of the media consumption history database, for example, by assigning a score of zero or another score indicating non-relevance to those entries that are identified as not relating to the search query, e.g., by assigning a score of zero to the entry 336 associated with "Cheeseburger in Paradise (776111)."

Information associated with relevant entries of the media consumption history database, e.g., information associated with the identified entries and the relevance scores assigned to the entries, can be transmitted to the query engine 320, and the query engine 320 can determine relevant information to provide for output in response to the search query. For instance, the query analysis engine 344 can transmit information to the query engine 320 that identifies the content items associated with the entries 332, 334 of the media consumption history database, information associated with the entries 332, 334, and relevance scores assigned to the entries 332, 334. In some implementations, information associated with all of the entries 332, 334, 336 of the media consumption history database and relevance scores assigned to those entries can be transmitted to the query engine 320.

Based on the received information relating to the entries of the media consumption history database and the relevance scores assigned to those entries, the query engine 320 can determine information to output in response to the search query, and can provide a response to the search query to the user. Providing information for output in response to the search query can involve providing information associated with content consumed by the user, e.g., information associated with the entries of the media consumption history database, along with other search query results, e.g., results obtained from the Internet.

In some implementations, the information related to the content consumed by the user can be displayed along with the other search query results, e.g., in the same area of an interface, or can be displayed separately from the other search query results, e.g., in a different area of the interface or at a different interface. For example, the query engine 320 can feature a results field 324 and can provide information for output at the results field 324 that includes both information related to the content consumed by the user that corresponds to the search query and other search query results.

In some implementations, the interface of the query engine 320 can include both a results field 324 and a results panel 326, such that information related to the content consumed by the user is provided for output at the results panel 326 and other results are provided for output at the results field 324. For example, information presented at the results panel 326 can include personal information for the figure "Justin Timberlake," e.g., a profession of "singer/actor" and a birth date of Jan. 31, 1981, as well as information identifying content that the user has consumed that is relevant to the figure "Justin Timberlake," e.g., "The 20/20 Experience" seen at "Radio City Music Hall" on Mar. 3, 2013. In some instances, the information presented at the results panel 326 can be determined based on the relevance scores assigned to the entries of the media consumption history database, e.g., such that the results panel 326 outputs information from one or more of the most relevant entries of the media consumption history database. Thus, information related to the entry 324 corresponding to the content "The 20/20 Experience (101001)" can be provided for output at the results panel 326, while other web results are provided for output at the results field 324.

Figure 4:
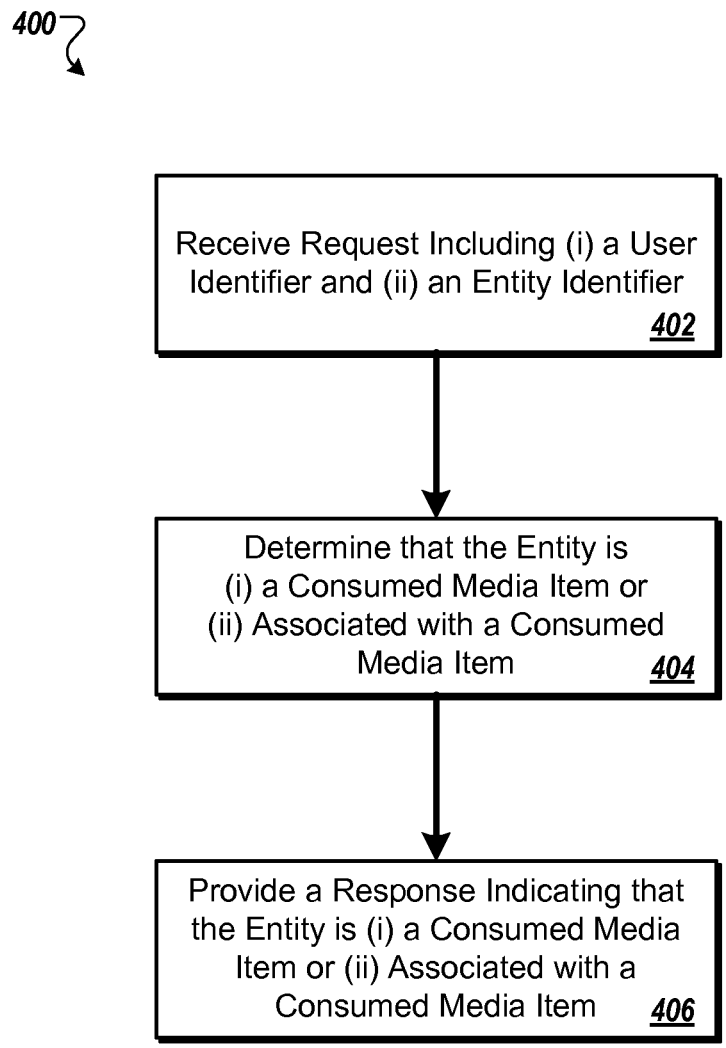
FIG. 4 depicts a flowchart of an example process for responding to requests based on a media consumption history.

FIG. 4 depicts a flowchart of an example process 400 for responding to requests for information based on a media consumption history. For example, the process 400 can be performed by the system 100 in response to a request for information provided by a user.

At step 402, a request is received that includes a user identifier and an entity identifier. For example, the content consumption engine 130 can receive data that includes data identifying a user and data identifying content and/or an entity associated with content. In some instances, the data that identifies the user can be data that identifies the user that input the request for information. The data identifying the user can be, for example, an IP address, a user account identifier, an email account identifier, or another identifier that identifies a particular user or group of users. In some instances, the data that identifies the entity can be data that identifies a particular entity associated with a content item and/or a content item. As described, data that identifies an entity can be data that identifies a content item or an entity associated with a content item that has been identified from the terms of the request for information, e.g., an entity that has been identified from the terms of a search query input at a search engine. For example, the data received at the content consumption engine 130 can be data that identifies a particular user, e.g., a user that input a search query at a search engine, and can include data identifying a particular entity, e.g., the figure "Justin Timberlake" or the movie "The Social Network."

At step 404, a determination is made as to whether the identified entity is a content item that has been consumed by a user or is an entity that is associated with a content item that has been consumed by a user. For example, based on receiving the information identifying the user and the particular entity, a media consumption history database associated with the content consumption engine 130 can be accessed. Entries of the media consumption history database can be identified that are associated with the user, e.g., that identify content consumed by the user and other information associated with the content and/or the consumption of the content by the user. The entity identified from the request for information can then be compared to the entries of the media consumption history database that are associated with the user to determine whether the identified entity is a content item that has been consumed by the user or is an entity that is associated with a content item that has been consumed by the user.

At step 406, based on determining that the identified entity is a content item that has been consumed by the user or is an entity that is associated with a content item that has been consumed by the user, a response is provided that indicates whether the identified entity is a content item that has been consumed by the user or an entity associated with a content item that has been consumed by the user. For example, the content consumption engine 130 can provide a response, e.g., to the query engine 120 or query analysis engine 144, that indicates whether the entity identified from the request for information is a content item that has been consumed by the user or is an entity associated with a content item that has been consumed by the user. In some implementations, as described, the response can include additional information associated with identified content items and/or the user's consumption of identified content items. For example, additional information included with the response may identify times and/or locations where the user consumed the content associated with the entity identified from the search query. Other information may be included with the response, e.g., additional information or different information that is determined based on accessing the media consumption history database associated with the content consumption engine 130.

In some implementations, a media consumption history associated with a user can be used to provide implicit responses to queries input by the user. For example, a user may provide a search query at a search engine, and providing a response to the query can involve identifying a topic associated with the query, accessing a media consumption history database associated with the user to identify content items that have been consumed by the user that relate to the topic of the query and/or entities associated with content items that have been consumed by the user that relate to the topic of the query, and providing an implicit response to the query based on identifying the content items associated with the topic and/or entities associated with the topic. An implicit response to a query can be provided, for example, by providing particular information in a knowledge panel or knowledge card that identifies the content items that have been consumed by the user that relate to the topic of the query and/or the entities associated with content items that have been consumed by the user that relate to the topic of the query.

In some instances, topics may include places that the content item and/or entity is associated with, e.g., a location where the plot of a movie takes place, can include a concept or activity that a content item and/or entity is associated with, e.g., a concept or activity about which song lyrics or a movie plot are focused, or can include other topics, e.g., topics referencing a particular time period, location, genre, etc.

In some implementations, providing an implicit response to a query can be performed based on determining that a user-input query does not identify a particular content item and/or entity. For example, if a user provides the input "movies starring Justin Timberlake," the entity "Justin Timberlake" may be identified from the query terms, and a response to the query may be provided that is not based on determining a topic of the query "movies starring Justin Timberlake," e.g., that is not an implicit response to the query. Rather, providing a response to such a query can involve accessing the media consumption history of the user to identify content items that have been consumed by the user that are associated with "Justin Timberlake," and/or entities associated with content items that have been consumed by the user that are associated with "Justin Timberlake," as described.

In other examples, if a query does not reference a particular content item or entity, e.g., if a user provides the query "movies about baseball," a topic can be identified based on the terms of the query. Based on determining the topic of the query, a search can be performed and content items and/or entities that relate to the topic can be identified based on the search results. For example, the system can perform a web search for "movies about baseball," and content items that match the "movie" content type and that reference "baseball" can be identified. In some instances, determining that a search result identifies a content item and/or entity associated with the topic referenced by the search query can involve determining that a resource associated with the search result, e.g., a document or web page, includes text or other content that identifies a particular content item and/or entity. For example, the system can determine that one or more web pages that are returned as search results for the query "movies about baseball" identify movies, e.g., by referencing a particular movie title or an entity associated with a particular movie.

In some implementations, identifying the content type, e.g., "movie," can enable the filtering of content items and/or entities associated with the topic. For instance, identifying the content type "movie" from the query "movies about baseball," can enable the system to filter content items and/or entities that are associated with the topic "baseball" that are songs, e.g., such that the song about baseball called "Centerfield" by "John Fogerty" will not be identified as a content item or entity associated with the query "movies about baseball."

Additionally, in some implementations, identifying content items and/or entities from search results that are associated with a query topic can include identifying only content items and/or entities that appear in multiple search results. For example, only content items that are identified in search results for "movies about baseball," that are identified in the first ten search results, and that are identified in at least three search results from the first three pages of returned search results, may be identified. By filtering search results in such a way, the probability that an identified content item and/or entity actually relates to the particular topic can be increased.

The system can compare the content items and/or entities that relate to the topic that are identified in the search results to the content items and/or entities identified in the user's media consumption history. For example, a search for "movies about baseball" can identify the content items "Field of Dreams," "A League of Their Own," and "The Sandlot," and these content items can be compared to content items in the user's media consumption history. If the media consumption history of the user identifies content items that match the content items identified by the search, e.g., if the user's media consumption history identifies "Field of Dream," "A League of Their Own," or "The Sandlot," then an implicit response to the user-input query can be provided that identifies the content items and/or entities that relate to the topic and that have been consumed by the user. For example, based on determining that the user has consumed "Field of Dreams" and "A League of Their Own," an implicit response to the query "movies about baseball" can be provided in the form of a knowledge panel or knowledge card that identifies "Field of Dreams" and "A League of Their Own," but that does not identify "The Sandlot," since the user has not consumed that content item. The knowledge panel or knowledge card be presented, in some implementations, along with one or more other web search results, e.g., along with the web search results for "movies about baseball" obtained by the system.

In addition to providing implicit responses based on topics associated with content items that have been consumed by a user and/or entities that are associated with content items that have been consumed by the user, implicit responses may also be provided based on topics associated with places that a user has visited. For example, based on a user providing the query, "buildings that look like the pyramids," the system can determine that the query relates to "location" entity types, and that the topic of the query is "pyramids." Based on the entity type and the topic, a search can be performed for "buildings that look like the pyramids," and entities identified from search results obtained for this search can be compared to places that the user has visited that are identified in the user's consumption history. For example, the system can determine that the "Luxor Las Vegas" is a building that has an appearance similar to the pyramids based on the search results, and can determine that the user has previously visited the "Luxor Las Vegas" based on accessing the user's consumption history. Based on this determination, an implicit response can be provided that identifies the "Luxor Las Vegas," for example, by providing information identifying the "Luxor Las Vegas" in a knowledge panel or knowledge card.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
receiving, from a user, a search query that identifies an entity;
querying a media consumption database that stores data representing a plurality of media items that are each identified as having been previously consumed by the user;
based on querying the media consumption database, determining that a particular media item, from among the plurality of media items, features the entity and is identified in the media consumption database as a media item that has been previously consumed by the user;
receiving a set of web results that are each distinct from the particular media item that features the entity, and that have each been identified in response to an Internet search performed using the search query; and
in response to receiving the search query, providing for output an interface that includes:
 (i) a first display region that shows a listing of the set of web results, and
 (ii) a second display region that shows information about the entity identified in the search query, wherein the information about the entity identified in the search query includes:
  (a) an indication that the entity is featured in the particular media item that has been indicated as consumed by the user,
  (b) an indication of a time when the particular media item is identified as having been consumed by the user, wherein the time when the particular media item is identified as having been consumed by the user is after a time that the particular media item was created, and
  (c) an indication of a location where the particular media item is identified as having been consumed by the user,
wherein the second display region is separated by a distance from the first display region so as to visually distinguish the second display region from the first display region.

2. The method of claim 1, wherein receiving, from the user, the search query that identifies the entity comprises:
receiving a search query that includes one or more query terms; and
identifying the entity based on the one or more query terms.

3. The method of claim 1, comprising:
receiving, from the user, data that includes a user identifier associated with the user; and
identifying, as the media consumption database and based on the data that includes the user identifier, a particular media consumption database that is associated with the user.

4. The method of claim 1, wherein the media consumption database identifies multiple entities that are featured by the particular media item.

5. The method of claim 1, wherein the Internet search is performed by a search engine using one or more query terms of the search query.

6. The method of claim 1, wherein:
the particular media item is a video and the entity featured in the particular media item is an individual that appears in the video, or
the particular media item is a song and the entity featured in the particular media item is an artist that is featured in the song.

7. The method of claim 1, further comprising:
receiving audio data corresponding to a particular media item playing in an environment of a computing device of the user;
receiving a location indicator corresponding to a location where the computing device was located when the media item played in the environment of the computing device;
processing the audio data with an audio recognition engine to identify the particular media item; and
determining whether the particular media item was consumed by the user based on an identity of the particular media item and the location indicator.

8. The method of claim 1, wherein at least one media item of the plurality of media items represented in the media consumption database is identified as having been previously consumed by the user based on an audio recognition engine having processed audio data captured in an environment of a computing device of the user to recognize the at least one media item.

9. A system comprising:
one or more computers and one or more storage devices storing instructions that are operable, when executed by the one or more computers, to cause the one or more computers to perform operations comprising:
receiving, from a user, a search query that identifies an entity;
querying a media consumption database that stores data representing a plurality of media items that are each identified as having been previously consumed by the user;
based on querying the media consumption database, determining that a particular media item, from among the plurality of media items, features the entity and is identified in the media consumption database as a media item that has been previously consumed by the user;
receiving a set of web results that are each distinct from the particular media item that features the entity, and that have each been identified in response to an Internet search performed using the search query; and
in response to receiving the search query, providing for output an interface that includes:
(i) a first display region that shows a listing of the set of web results, and
(ii) a second display region that shows information about the entity identified in the search query, wherein the information about the entity identified in the search query includes:
(a) an indication that the entity is featured in the particular media item that has been indicated as consumed by the user,
(b) an indication of a time when the particular media item is identified as having been consumed by the user, wherein the time when the particular media item is identified as having been consumed by the user is after a time that the particular media item was created, and
(c) an indication of a location where the particular media item is identified as having been consumed by the user,
wherein the second display region is separated by a distance from the first display region so as to visually distinguish the second display region from the first display region.

10. The system of claim 9, wherein receiving, from the user, the search query that identifies the entity comprises:
receiving a search query that includes one or more query terms; and
identifying the entity based on the one or more query terms.

11. The system of claim 9, comprising:
receiving, from the user, data that includes a user identifier associated with the user; and
identifying, as the media consumption database and based on the data that includes the user identifier, a particular media consumption database that is associated with the user.

12. The system of claim 9, wherein the media consumption database identifies multiple entities that are featured by the particular media item.

13. A non-transitory computer-readable storage device storing software comprising instructions executable by one or more computers which, upon such execution, cause the one or more computers to perform operations comprising:
receiving, from a user, a search query that identifies an entity;
querying a media consumption database that stores data representing a plurality of media items that are each identified as having been previously consumed by the user;
based on querying the media consumption database, determining that a particular media item, from among the plurality of media items, features the entity and is identified in the media consumption database as a media item that has been previously consumed by the user;
receiving a set of web results that are each distinct from the particular media item that features the entity, and that have each been identified in response to an Internet search performed using the search query; and
in response to receiving the search query, providing for output an interface that includes:
(i) a first display region that shows a listing of the set of web results, and
(ii) a second display region that shows information about the entity identified in the search query, wherein the information about the entity identified in the search query includes:
(a) an indication that the entity is featured in the particular media item that has been indicated as consumed by the user,
(b) an indication of a time when the particular media item is identified as having been consumed by the user, wherein the time when the particular media item is identified as having been consumed by the user is after a time that the particular media item was created, and
(c) an indication of a location where the particular media item is identified as having been consumed by the user,
wherein the second display region is separated by a distance from the first display region so as to visually distinguish the second display region from the first display region.

14. The computer-readable device of claim 13, wherein receiving, from the user, the search query that identifies the entity comprises:
receiving a search query that includes one or more query terms; and
identifying the entity based on the one or more query terms.

15. The computer-readable device of claim 13, comprising:
receiving, from the user, data that includes a user identifier associated with the user; and
identifying, as the media consumption database and based on the data that includes the user identifier, a particular media consumption database that is associated with the user.

* * * * *

UNITED STATES PATENT AND TRADEMARK OFFICE
CERTIFICATE OF CORRECTION

Page 1 of 1

PATENT NO.        : 10,198,442 B2
APPLICATION NO.   : 14/142171
DATED             : February 5, 2019
INVENTOR(S)       : Sharifi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 177 days.

Signed and Sealed this
Seventeenth Day of September, 2019

Andrei Iancu
*Director of the United States Patent and Trademark Office*